United States Patent
Rajagopalan et al.

(10) Patent No.: US 8,954,986 B2
(45) Date of Patent: Feb. 10, 2015

(54) SYSTEMS AND METHODS FOR DATA-PARALLEL PROCESSING

(75) Inventors: Mohan Rajagopalan, Mountain View, CA (US); Ali-Reza Adl-Tabatabai, San Jose, CA (US); Yang Ni, Sunnyvale, CA (US); Adam Welc, San Francisco, CA (US); Richard L. Hudson, Florence, MA (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 12/971,891

(22) Filed: Dec. 17, 2010

(65) Prior Publication Data

US 2012/0159495 A1    Jun. 21, 2012

(51) Int. Cl.
  *G06F 9/46* (2006.01)
  *G05B 19/18* (2006.01)
  *G06F 7/38* (2006.01)
  *G06F 9/48* (2006.01)
  *G06F 9/50* (2006.01)

(52) U.S. Cl.
  CPC ............ *G06F 9/4881* (2013.01); *G06F 9/5066* (2013.01)
  USPC ........... 718/107; 718/101; 718/100; 712/220; 700/4

(58) Field of Classification Search
  None
  See application file for complete search history.

(56) References Cited

U.S. PATENT DOCUMENTS

| | | |
|---|---|---|
| 6,173,373 B1 | 1/2001 | Bonola |
| 7,117,502 B1 | 10/2006 | Harris |
| 2008/0112423 A1 | 5/2008 | Christenson |
| 2009/0210433 A1 | 8/2009 | Werner et al. |

FOREIGN PATENT DOCUMENTS

WO    2012/082330 A1    6/2012

OTHER PUBLICATIONS

Chen et al; Dynamic Load Balancing on Single- and Multi-GPU Systems; IEEE Apr. 19-23, 2010.*
Michael, Maged M. et al., "Simple, Fast, and Practical Non-Blocking and Blocking Concurrent Queue Algorithms", Proceedings of the fifteenth annual ACM symposium on Principles of distributed computing (PODC) 1996, 9 Pages.
Agrawal, Kunal et al., "Adaptive work-stealing with parallelism feedback", ACM Transactions on Computer Systems (TOCS), vol. 26 Issue 3, Sep. 2008, 2 pages.

(Continued)

*Primary Examiner* — Meng An
*Assistant Examiner* — Bing Zhao
(74) *Attorney, Agent, or Firm* — Schwabe, Williamson & Wyatt, P.C.

(57) ABSTRACT

Methods, systems, and mediums are described for scheduling data parallel tasks onto multiple thread execution units of processing system. Embodiments of a lock-free queue structure and methods of operation are described to implement a method for scheduling fine-grained data-parallel tasks for execution in a computing system. The work of one of a plurality of worker threads is wait-free with respect to the other worker threads. Each node of the queue holds a reference to a task that may be concurrently performed by multiple thread execution units, but each on a different subset of data. Various embodiments relate to software-based scheduling of data-parallel tasks on a multi-threaded computing platform that does not perform such scheduling in hardware. Other embodiments are also described and claimed.

16 Claims, 16 Drawing Sheets

(56) References Cited

OTHER PUBLICATIONS

"OpenCL", From Apple Developer, Snow Leopard Technologies, Retrieved on Nov. 18, 2010, Webpage available at: developer.apple.com/technologies/mac/snowleopard/opencl, 1 page.

Arora, Nimar S. et al., "Thread Scheduling for Multiprogrammed Multiprocessors", Proceedings of the Tenth Annual ACM Symposium on Parallel Algorithms and Architectures (SPAA), Jun. 1998, pp. 1-11.

Chase, David et al., "Dynamic Circular Work-Stealing Deque", SPAA'05, Jul. 18-20, 2005, 8 pages.

"Hadoop", From Apache, Retrieved on Nov. 18, 2010, Webpage available at: hadoop.apache.org/, 3 pages.

"NVIDIA CUDA", Compute Unified Device Architecture, Programming Guide Version 0.8, Feb. 12, 2007, 83 pages.

Ghuloum, Anwar et al., "Future-Proof Data Parallel Algorithms and Software on Intel® Multi-Core Architecture", Intel Technology Journal, vol. 11, Issue 04, Published on Nov. 15, 2007, 18 pages.

Herlihy, Maurice et al., "Obstruction-Free Synchronization: Double-Ended Queues as an Example", Proceedings 23rd International Conference, Distributed Computing Systems, Issue Date May 19-22, 2003, pp. 522-529.

"Threading Building Blocks", From Intel Corporation, Open Source Version 3.0, Documentation, Retrieved on Nov. 18, 2010, Webpage available at: threadingbuildingblocks.org/, 2 pages.

Munshi, Aaftab, "The OpenCL Specification", Khronos Group, Version 1.0, Document Revision 48, Last Revision Date Jun. 10, 2009, pp. 1-308.

Lee, Victor W. et al., "Debunking the 100X GPU vs. CPU myth: an evaluation of throughput computing on CPU", Proceedings of the 37th annual international symposium on Computer architecture, ISCA'10, vol. 38, Issue 3, Jun. 2010, 2 pages.

Marlow, Simon et al., "Runtime Support for Multicore Haskell", Proceeding of the 14th ACM SIGPLAN International Conference on Functional Programming, Jun. 22, 2009, pp. 1-13.

"OpenCL", From NVIDIA Developer Zone, Retrieved on Nov. 18, 2010, Webpage available at: developer.nvidia.com/object/opencl.html, 1 page.

Mathewson, Nick et al., "libevent—an event notification library", Retrieved on Nov. 18, 2010, Webpage available at: monkey.org/~provos/libevent/.

Rajagopalan, Mohan et al., "Profile-directed optimization of event-based programs", Proceedings of the ACM SIGPLAN 2002 Conference on Programming language design and implementation (PLDI), vol. 37, Issue 5, May 2002, 10 Pages.

Saha, Bratin et al., "Programming model for a heterogeneous x86 platform", Proceedings of the 2009 ACM SIGPLAN conference on Programming language design and implementation (PLDI), vol. 44, Issue 6, Jun. 2009, 1 page.

Supercomputing Technologies Group, "Cilk 5.4.6 Reference Manual", Nov. 2001, 56 pages.

"ATI Stream Technology", From AMD, Retrieved on Nov. 18, 2010, Webpage available at: amd.com/us/products/technologies/stream-technology/pp./stream-technology.aspx, 1 page.

"DirectX 11", From Microsoft DirectX, Microsoft Corporation, Retrieved on Nov. 18, 2010, Webpage available at: .microsoft.com/games/en-US/aboutGFW/pp./directx.aspx, 2 pages.

Search Report and Written Opinion Received for International Patent Application No. PCT/US2011161799, mailed on May 30, 2012, 10 pages.

International Preliminary Report on Patentability received for International Patent Application No. PCT/US2011161799, mailed on Jun. 27, 2013, 7 pages.

Robison, A. et al., "Optimization via Reflection on Work Stealing in TBB," IEEE International Symposium, IPDPS 2008, Issue Date Apr. 14-18, 2008, pp. 1-8.

\* cited by examiner

SYSTEMS AND METHODS FOR DATA-PARALLEL PROCESSING

FIELD

This invention relates to the field of processor execution and, in particular, to execution of instructions.

BACKGROUND

An advantage to users of many multi- and many-core computing platforms lies in the ability to efficiently express parallelism. Task parallelism, for example, is a form of parallelism that distributes execution processes (threads) across different parallel computing nodes. For task parallelism, each computing node may execute a different set of instructions. In contrast, data parallelism focuses on distributing the data, rather than tasks, across different parallel computing nodes. Data parallelism is achieved when each computing node performs the same task on different pieces of distributed data. In some situations, different threads control the different data-parallel operations, but they execute the same software code instructions (on different data).

Several classes of programs, such as in graphics, physics and financial workloads, are often not easily task-parallelizable. Still, many such programs can greatly benefit from data-parallel approaches, wherein concurrently executing tasks (also called execution threads or worker threads) perform the same actions on a subset of the original data. For processing systems that are not designed with specialized hardware to schedule data-parallel tasks, the scheduling of data-parallel tasks is performed in software.

For a runtime that supports scheduling of data-parallel tasks in software, multiple threads need to concurrently evaluate sub-tasks (also referred to herein as "data-parallel" tasks or "work items"), where each of the multiple threads performs the same action on a sub-set of the original data. One challenge for such software approaches is to efficiently schedule the sub-tasks. That is, it is a challenge to efficiently select and schedule particular sub-tasks to run on particular threads. In other words, a key challenge that needs to be addressed is the efficient distribution of data-parallel work to each of the underlying worker threads.

BRIEF DESCRIPTION OF THE DRAWINGS

Embodiments of the invention of the appended claims are illustrated by way of example and not intended to be limited by the figures of the accompanying drawings.

FIG. 4, including

FIG. 5, including

FIG. 8, including

FIG. 12, including

DETAILED DESCRIPTION

In the following description, numerous specific details are set forth such as examples of specific data structures for scheduling queues and mapping vectors, specific types of multi-core processing platforms, specific numbers of nodes in demonstrative scheduling queues and specific numbers of threads in a multi-threaded system, specific data granularities, and specific types of memory accesses and locations, etc. in order to provide a thorough understanding of the present invention. It will be apparent, however, to one skilled in the art that these specific details need not be employed to practice the present invention. In other instances, well known components or methods, such as common queue management operations, order of operations shown in pseudo code and flowcharts, specific and alternative multi-core and multi-threaded processor architectures, particular programming models and computation models, specific compiler methods and implementations, and certain operational details of microprocessors, have not been described in detail in order to avoid unnecessarily obscuring the present invention.

Figure 1:
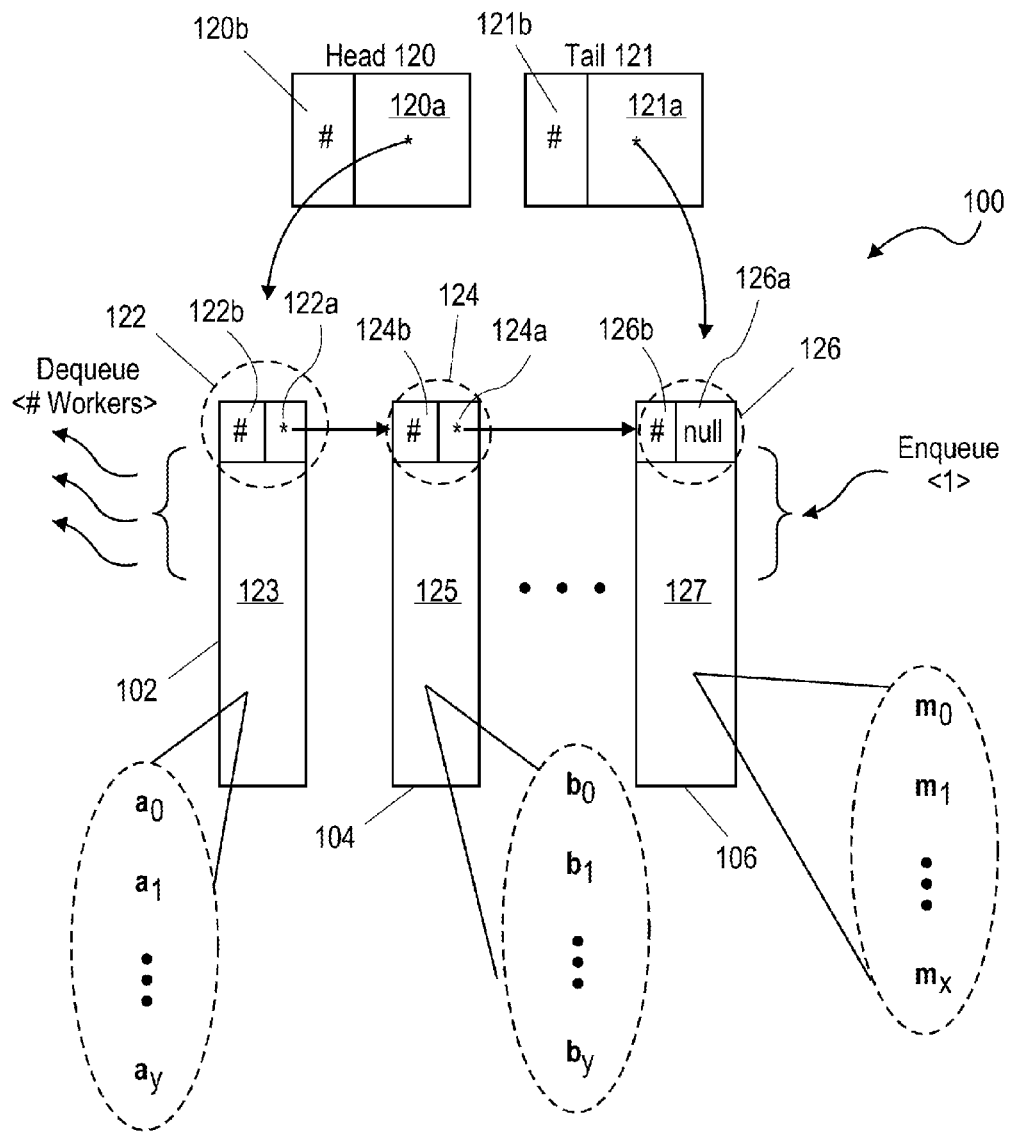
FIG. 1 is a block diagram illustrating at least one embodiment of a data-parallel scheduling queue that allows multiple threads to concurrently access a task stored in a queue node without removing that node from the queue.

FIG. 1 is a block diagram illustrating at least one embodiment of a data-parallel scheduling queue ("DPQ") 100. Disclosed methods, discussed below, for storing, adding, deleting, and managing data in the DPQ 100 provide for concurrent de-queue of a particular node 102, 104, 106 by multiple worker threads. Such concurrent de-queue capability allows the worker threads (e.g., 740, 741, 742, 74n of FIG. 7) to concurrently access sub-tasks (e.g., $a_0$-$a_y$, $b_0$-$b_y$, $m_0$-$m_x$) stored in a queue node (e.g., 102, 104, 106, respectively) without removing that node from the queue 100. The queue 100 is structured differently than a traditional FIFO (first-in-first-out) queue, in order to provide the data-parallel scheduling features (including lock-free enqueue as well as wait-free and high scalability) discussed herein.

Figure 2:
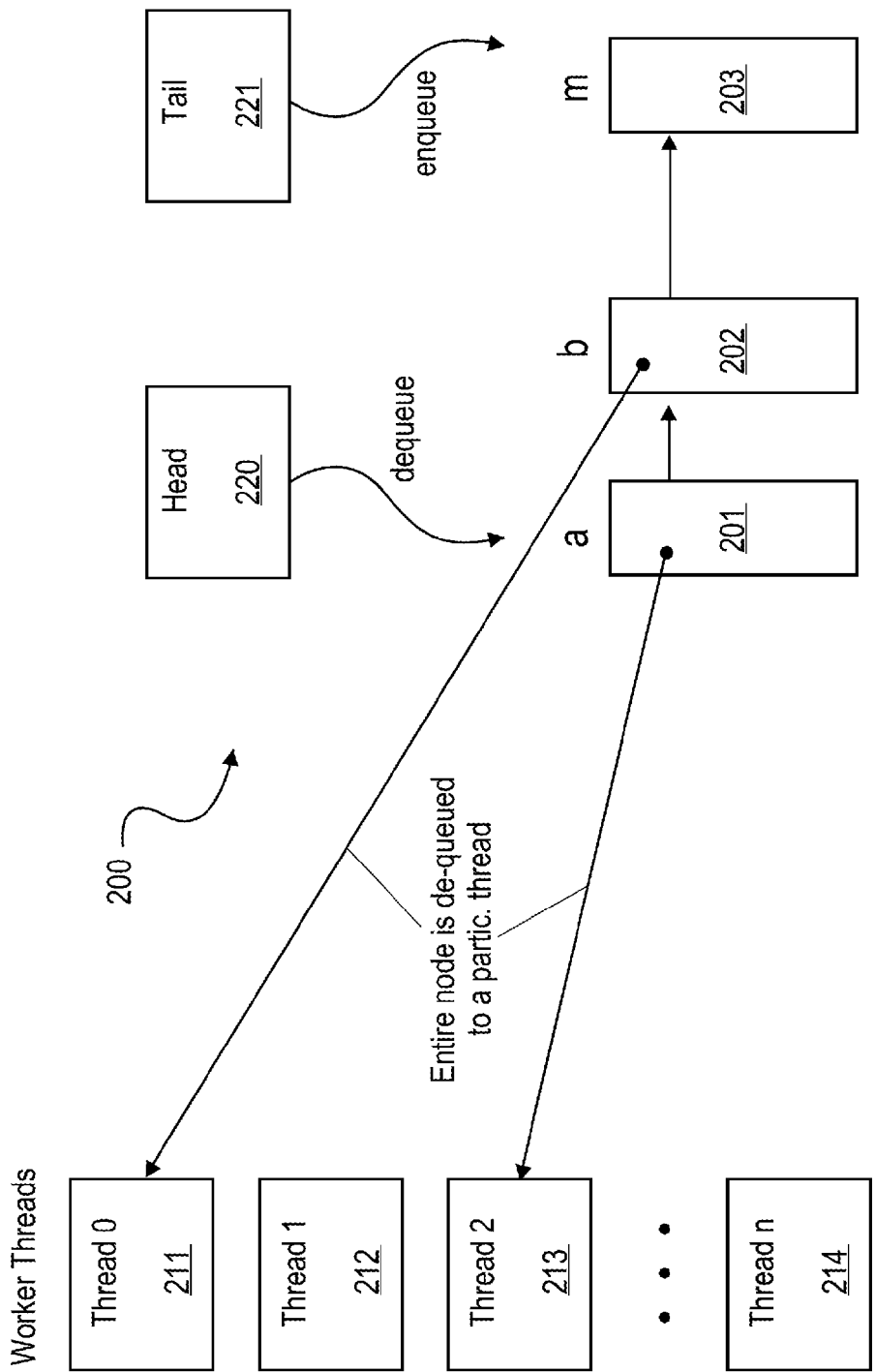
FIG. 2 is a block diagram illustrating at least one embodiment of a task-based queue.

FIG. 2 is a block diagram illustrating a FIFO queue 202 that may be used for task-parallel scheduling. For the following discussion, FIGS. 1 and 2 are referenced together. FIGS. 1 and 2 illustrate that both the task-parallel queue 200 of FIG. 2 and the data-parallel DPQ 100 are FIFO (first in, first out)

queues in that are both designed to be operated on by methods to add ("enqueue") nodes to the tail end and to delete ("dequeue") nodes (102, 104, 106 and 201, 202, 203, respectively) from the head end. That is, the tail ends of the respective queues (100, 200) are pointed to by a respective tail pointer (121, 221). Methods of operating on the queues 100, 200 provide that new task nodes are enqueued to the end of the queue pointed to by the tail pointer (121, 221). Similarly, the head ends of the respective queues (100, 200) are pointed to by a respective head pointer (120, 220). Both queues implement a lock-free scheme in that no locks or semaphores are used to synchronize concurrent access to the queues by multiple threads 211, 212, 213, 214.

For both queues 100, 200 nodes are de-queued from the head end of the queues 100, 200. However, FIG. 2 illustrates that de-queue (removal) of a node (e.g., 201, 202) is accomplished by a single worker thread 213, 211 that is then to evaluate the task indicated by the node. In contrast, the structure of the DPQ 100 illustrated in FIG. 1, along with embodiments of the methods 400, 500, 600, 800, 1200 discussed below, operate to provide a mechanism to allow multiple threads to concurrently access a different respective sub-task associated with a queue node 102, 104, 106 without removing that node from the queue 100. Accordingly, multiple threads can concurrently "pick" for execution sub-tasks from the same node of the DPQ 100 (see discussion of FIGS. 8 and 12, below). Accordingly, a difference between the queue 100 of FIG. 1 and the queue of FIG. 2 lies in the type of data that is associated (or "stored") in each node of the queue.

In contrast to the nodes of the FIG. 2 queue 200, the nodes of the queue 100 of FIG. 1 do not merely store information for a single task to be performed by a single thread. Instead, each node of the DPQ 100 includes a field 123, 125, 127 to store a reference to a data-parallel task. Worker threads may use this reference to "pick" independent sub-tasks for execution. A node may be removed ("de-queued") from the DPQ 100 after all threads have successfully picked the node. That is, the node is de-queued after all sub-tasks have been evaluated.

As stated above, the queue 200 represented in FIG. 2 differs from the DPQ 100 illustrated in FIG. 1 in that a node of the DPQ 100 is only de-queued after all sub-tasks have been evaluated. Thus, a worker thread does not necessarily de-queue a node from the DPQ 100 when the thread "picks" work from the node. Instead, the de-queue function for the DPQ 100 simply removes the node and frees memory associated with it. In other words, the de-queue operation for a DPQ 100 does not return a value to the worker thread that initiated the de-queue operation. (See discussion of FIG. 5, below, for further discussion of an embodiment of the de-queue operation).

The structure of the DPQ 100, and particular methods of operating with the data in the DPQ 100, thus provide distinct benefits for scheduling of data-parallel workloads. For illustrative purposes only, a pseudo code definition of the queue 100 is set forth in Table 1, along with a pseudo code definition of the pointers and nodes that make up the queue 100.

TABLE 1

Pseudo code for Definition of DPQ, nodes and pointers 1. struct Pointer { Node* addr; unsigned int count;}
2. struct Node { void* value; Pointer next;};
3. struct DPQueue { Pointer Head; Pointer Tail}

Also for illustrative purposes only, a pseudo code definition of an initialization operation for the DPQ 100 is set forth in Table 2. Each of these tables is provided as an example only, and in no way should be taken as limiting the scope of the appended claims.

TABLE 2

Pseudo code for Initialization of DPQ

1. Initialize_queue(DPQueue *Q){
2. Node * node = new_node( );
3. node->next.addr = NULL;
4. Q->Head = Q->Tail = <node,0>;
5. }

Figure 3:
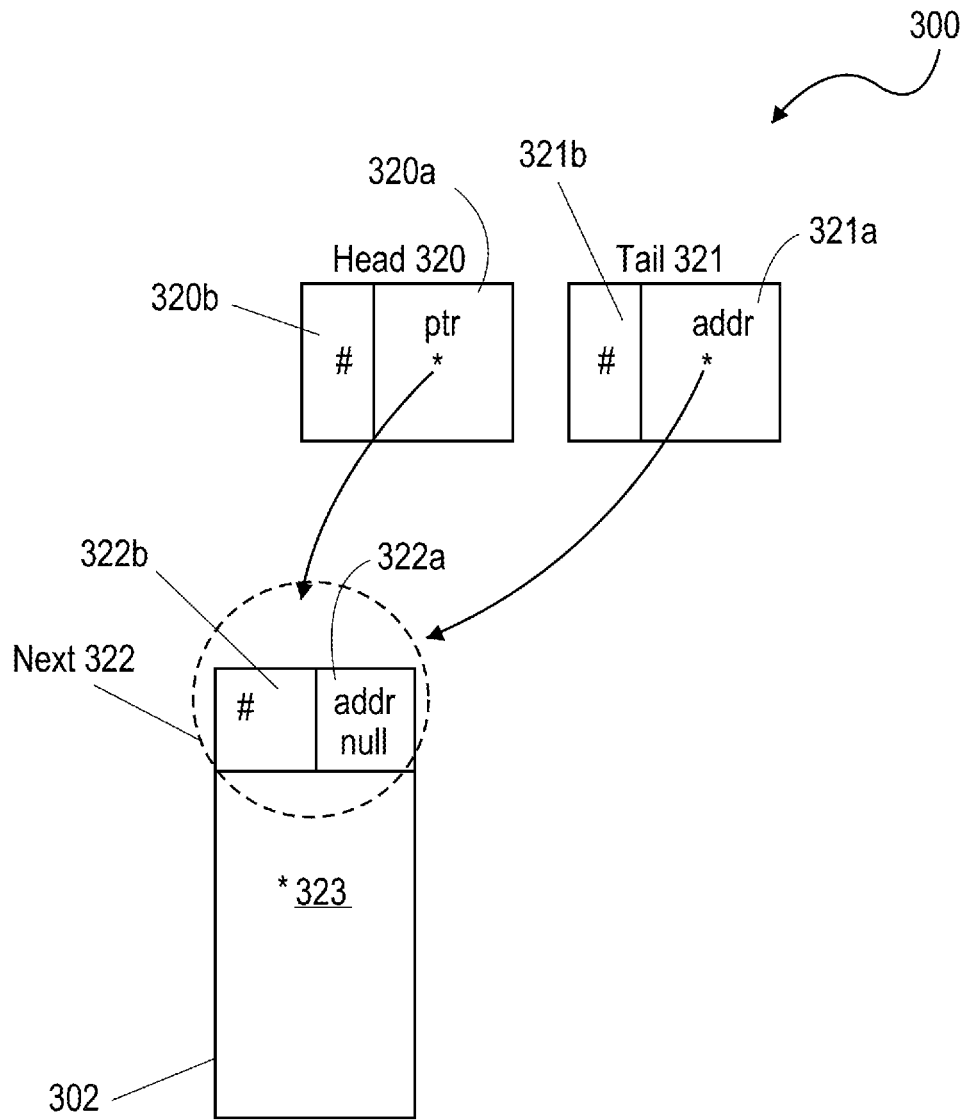
FIG. 3 is a block diagram illustrating the creation and initialization of an empty data-parallel scheduling queue.

FIG. 3 is a block diagram illustrating the creation and initialization of an empty data-parallel queue 300. The DPQ 100 of FIG. 1 is referenced herein along with FIG. 3 to further discuss certain aspects of a DQP 100, 300. A Pointer (e.g., 120, 121, 122, 124, 126, 320, 321, 322) to a DPQ node (102, 104, 106, 302) is represented by a single tuple that includes an address field 120a, 121a, 122a, 124a, 126a, 320a, 321a, 320a to hold the address of a queue node. For example, the address field 120a of Pointer Head 120 holds the address of node 102 in FIG. 1. Similarly, the address field 122a of Pointer Next 122 (FIG. 1) holds the address of node 104 (FIG. 1), and address field 320a (FIG. 3) of Pointer Head 320 (FIG. 3) holds the address of node 302 (FIG. 3).

For at least some embodiments, a Pointer 120, 121, 122, 124, 126, 320, 321, 322, may also include a field 120b, 121b, 122b, 124b, 126b, 320b, 321b, 322b, to hold a counter value.

The nodes (e.g., 102, 104, 106, 302) each contain a Pointer (e.g., 122, 124, 126, 322, respectively), as described above, which is referred to as "Next" in FIG. 3. As is described above, each of the Next Pointers may include an address field and a count field. The nodes (e.g., 102, 104, 106, 302) may also include a value field (123, 125, 127, 323, respectively). The value field is to hold a reference to a value. For at least one embodiment, the value referenced by the value held in the value field (123, 125, 127, 323) indicates the instruction(s) for the task(s) to be performed as well as data on which the task is to be performed.

FIGS. 1 and 3 illustrate that the DPQ nodes 102, 104, 106 (FIG. 1) and 302 (FIG. 3) are stored as singly linked list delimited by the head pointer 120, 320 (respectively) and tail pointer 121, 312 (respectively). During scheduling and evaluation, the DPQ 100 (FIG. 1), 300 (FIG. 3) is traversed from head to tail by the worker threads (not shown in FIGS. 1 and 3; see, e.g., 740, 741, 742, 74n of FIG. 7). The head pointer 120, 320 of a DPQ 100, 300 points to the first node in the queue. The value field (e.g., 323) for the first node in the queue 300 (e.g., node 302) contains a reference to a dummy value. Thus, the first non-dummy queue node is the second node 104 (FIG. 1) of a non-empty DPQ 100.

For at least one embodiment, the Tail Pointer 121 (FIG. 1), 321 (FIG. 3) of a DPQ may point to the last node in the DPQ 300. For at least some other embodiments, the Tail pointer 121 may point to the next-to-last node in the DPQ 300. The address field (e.g., 126a) for the last node in the queue (represented, e.g., as node 106 in FIG. 10), holds a null value.

FIG. 3 illustrates that, after initialization, the DPQ 300 always includes at least one node. An empty DPQ 300 includes a single dummy node 302 that is pointed to by both the Head Pointer 320 and Tail Pointer 321. Upon execution of an initialization sequence such as that illustrated in Lines 1-5 of Table 2, the DPQ 300 is empty, containing only a dummy node 302. The single dummy node 302 of FIG. 3 holds a null value in its address field 322a.

FIG. 4 is a block diagram and flowchart illustrating at least one embodiment of an enqueue method 400 that may be performed to add a new node 304 to an empty DPQ, such as the empty DPQ 300 illustrated in FIG. 3. Like reference numerals in FIGS. 3 and 4 represent like elements. For illustrative purposes only, a pseudo code representation of an enqueue operation 400 for the DPQ 300 is set forth in Table 3, below. Table 3 is provided as an example only, and in no way should be taken as limiting the scope of the appended claims.

TABLE 3

Pseudo code for Enqueue of DPQ Node

```
1.   Enqueue(DPQueue *Q, void * task){
2.       Node * node = new_node( );
3.       node->value = task; node->next.addr = NULL;
4.
5.       while(1){
6.           Pointer tail = Q->Tail;
7.           Pointer next = tail.addr->next;
8.           if (tail == Q->Tail){
9.               if (next.addr == NULL){
10.                  if CAS(&tail.addr->next, next, <node,
                         next.count+1>)
11.                      break;
12.              } else {
13.                  CAS(&Q->Tail,tail,<next.addr,tail.count+1>)
14.              }
15.          }
16.      }
17.      CAS(&Q->Tail, tail, <node, tail.count+1>);
18.  }
```

Figure 4A:
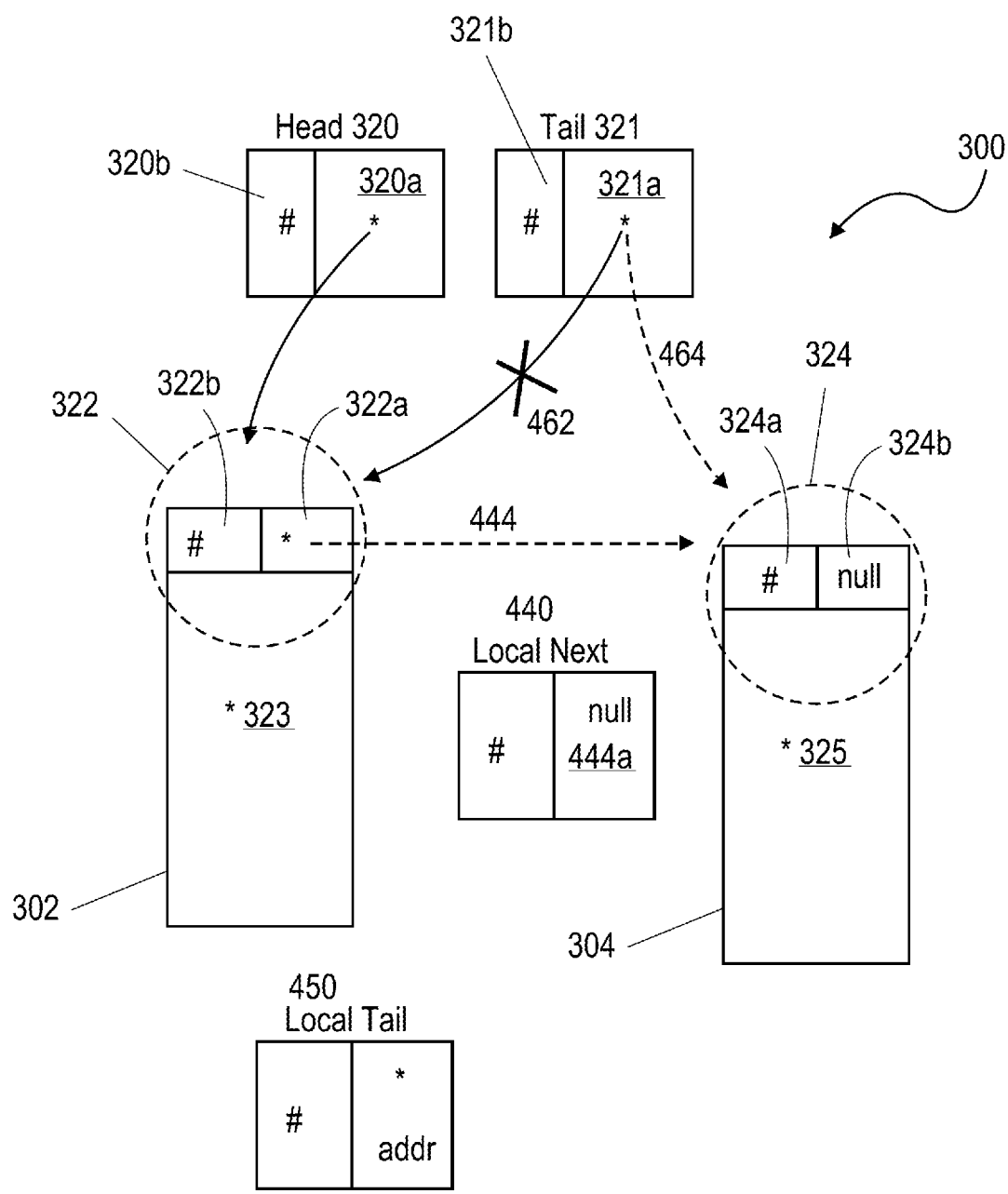
FIG. 4A and FIG. 4B, is a block diagram and flowchart respectively, illustrating at least one embodiment of a method for adding a node to a data-parallel scheduling queue.
Figure 4B:
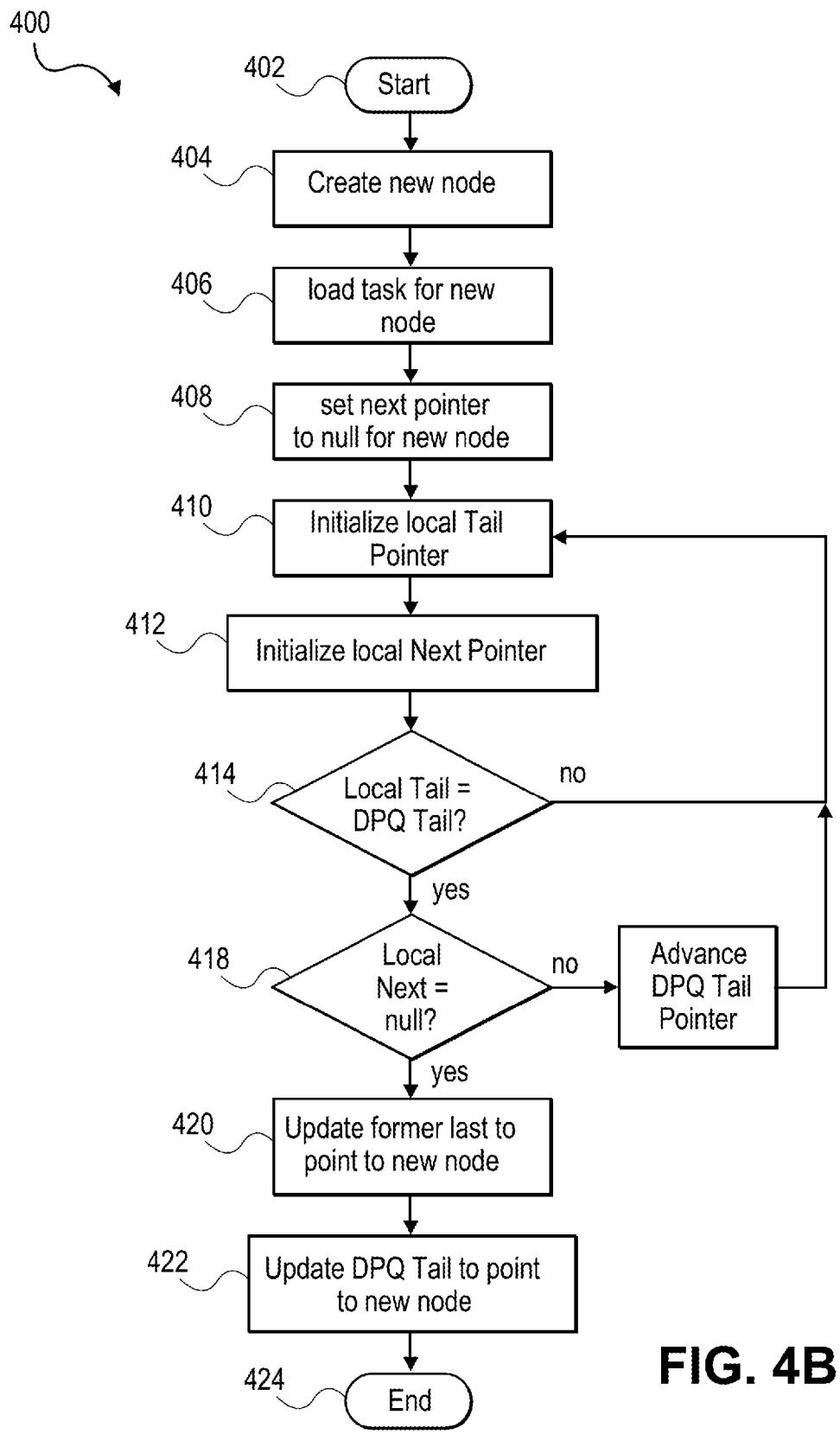

FIG. 4, including FIG. 4A and FIG. 4B, illustrates that processing for the enqueue operation 400 begins at block 402 and proceeds to initialization blocks 404, 406 and 408. At block 404, the new node 304 is created. The value field 325 is initialized at block 406 with a reference to the data-parallel task to be performed. Processing then proceeds to block 408, where the where the address field 324b for the Next Pointer 324 of the new node 304 is initialized to a null value, since the new node 304 is to be enqueued at the tail end of the DPQ 300. The initialization operations at blocks 404, 406 and 408 are represented at lines 2 and 3 of Table 4.

From block 408, processing proceeds to blocks 410 and 412, where local pointer variables are initialized. For one embodiment, the Tail Pointer 321 is copied to a local variable, Local Tail 450 at block 410. At block 412 a local variable (Local Next 440) is initialized to be a copy of the Next Pointer 322 of the current node 302 to which the address field 321a of the DPQ Tail Pointer 321 points. For example, assume that such operation 412 is performed on a null DPQ 300 such as that illustrated in FIG. 3. In such case, the address field 440a of the Local Next Pointer 440 is initialized at block 412 as a null value, since the address field 322a of the dummy node 302 holds a null value. Embodiments of the local variable initialization reflected at blocks 410 and 412 correspond to lines 6 and 7 of Table 3.

From Block 412, processing proceeds to block 414. It is possible that the Tail Pointer 321 may have fallen behind and thus no longer points to the last node in the DPQ 300. This may happen, for example, if another thread successfully performed the enqueue operation 400 while the current thread was performing blocks 410 and 412.

If this has happened, the Local Tail Pointer 450 may no longer be in synch with the global DPQ Tail Pointer 321, despite the earlier initialization operation at block 410. This condition is checked at block 414, and corresponds to Line 3 of Table 3. If the Local Tail Pointer 450 does not match the global DPQ Tail Pointer 321 at block 414, then processing proceeds to back to block 410 in order to make a new copy of the Local Tail Pointer 450 and try the process again.

If the Local Tail Pointer and the global DPQ Tail Pointer are still in synch at block 414, then processing proceeds to block 418. At block 418, another determination is performed in order to confirm the Local Tail Pointer 450 indeed points to the last node in the DPQ 300. At block 418 it is determined whether the address field 440a for the local next pointer 440 is null. At least one embodiment of the processing of block 418 corresponds to Line 9 of Table 3.

If the local and global tail pointers (450 and 321) are the same (see block 412) but the address field 440a of the local next pointer 440 is not null, then the Tail pointer 321 has fallen behind and does not point to the last node in the DPQ 300. In such case, processing proceeds to block 416. Otherwise, processing proceeds to block 420.

At block 416, an attempt is made to refresh the tail pointer. An embodiment of this refresh operation 416 corresponds to line 13 of Table 3. From block 416, processing then proceeds back to block 410 and attempts to begin the enqueue operation afresh.

If both of blocks 414 and 418 evaluate to "true", then processing proceeds to block 420. At block 420, the new node 304 is inserted after the last node in the DPQ 300. For at least one embodiment, this insertion is performed by executing an atomic compare and swap operation to update the address field 322a of the node 302 pointed to by the Local Tail Pointer 450. The field 322a is updated to point to the new node 304 that was created at block 404. The updated value of the field 322b is reflected by dotted line 444 in FIG. 4A. An embodiment of the processing of block 420 corresponds to line 10 of Table 3.

FIG. 4B illustrates that processing proceeds from block 420 to block 422. At block 422, the DPQ Tail Pointer 321 is updated so that its address field 321a points to the new node (304). This operation is reflected in the crossed out line 462 and dotted line 464. Dotted line 464 indicates the new address value for the address field 321a of the DPQ Tail Pointer 321 after operation 422, and crossed-out line 462 indicates the old address value. For at least one embodiment, the advancement of the Tail Pointer address field 321a at operation 422 is performed via an atomic CAS operation. Such processing of block 422 corresponds to line 17 of Table 3. From block 422, processing ends at block 424.

Figure 5A:
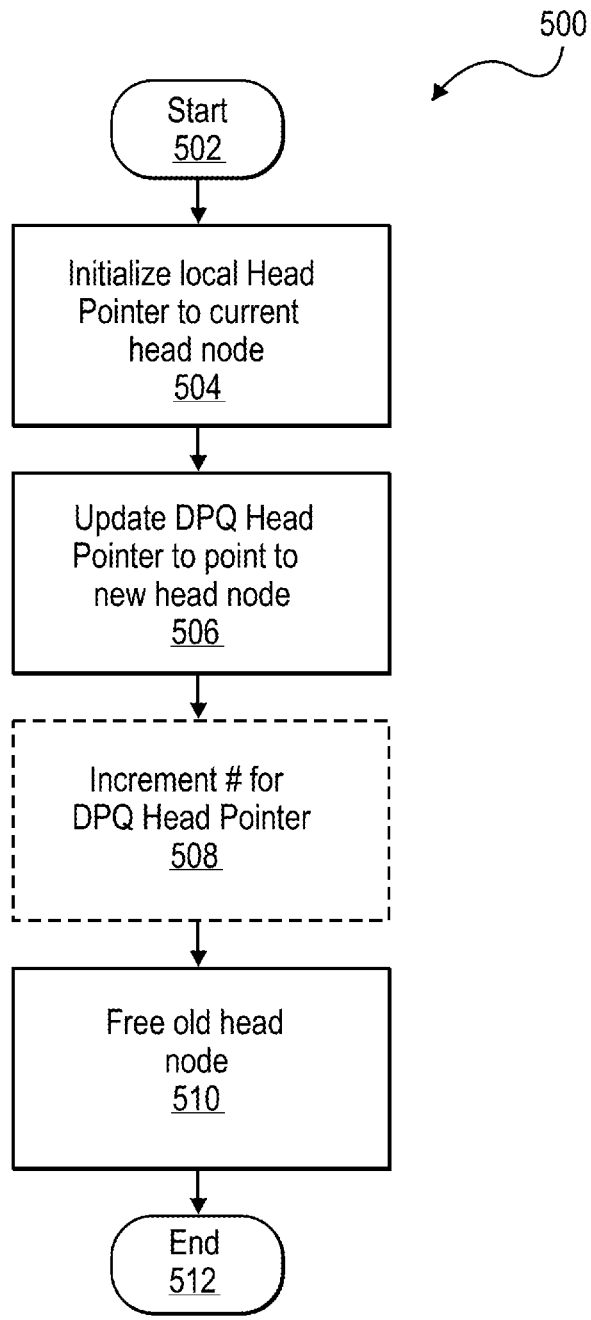
FIG. 5A and FIG. 5B, is a flowchart and block diagram, respectively, illustrating at least one embodiment of a method for deleting a node from data-parallel scheduling queue.
Figure 5B:
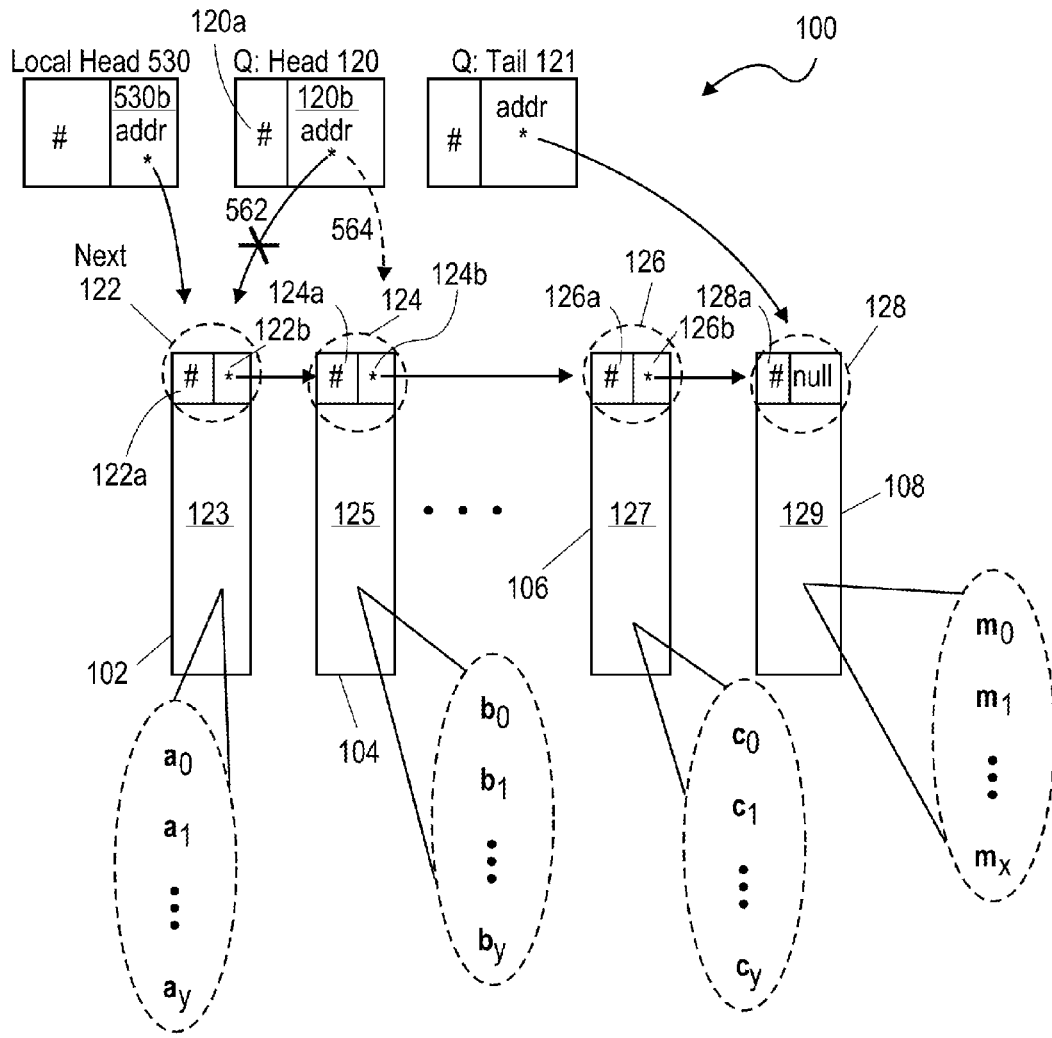

FIG. 5 includes a block diagram (FIG. 5B) and flowchart (FIG. 5A) illustrating at least one embodiment of a de-queue method 500 that may be performed to remove a node from a DPQ, such as the DPQ 100 illustrated in FIG. 1. For the illustrative example of FIG. 5, an additional node 108 has been enqueued at the tail end of the DPQ 100, in addition to the nodes 102, 104, 106 shown in FIG. 1. Like reference numerals in FIGS. 1 and 5 represent like elements. For illustrative purposes only, a pseudo code representation of a de-queue method 500 for the DPQ 100 is set forth in Table 4, below. Table 4 is provided as an example only, and in no way should be taken as limiting the scope of the appended claims.

TABLE 4

Pseudo code for De-queue of DPQ Node

```
1.   Dequeue(DPQueue *Q){
2.       Pointer head = Q->Head;
3.       Q->Head.addr = head.addr->next.addr;
4.       (Q->Head.count)++;
5.         free(head.addr);
6.   }
```

For at least one embodiment, the DPQ linked list 100 is always connected since the next pointer of an inserted node is not set to NULL before it is freed. In fact, the only time a node can be deleted is when it is at the beginning of the list and thus pointed to by the DPQ Head pointer 120. Before a node is deleted, the Head pointer 120 is safely updated to point to its next pointer. Note that when the list is empty, it contains a dummy node.

For purposes of example and discussion only, FIG. 5 illustrates a de-queue example wherein all work (e.g., $a_1$ through $a_y$) for a node 102 has been performed and the node 102 is to be de-queued. In general, embodiments of de-queue method 500 illustrated in FIG. 5 may be performed responsive to the condition that all worker threads have completed processing their respective sub-tasks for a given node 105. However, one of skill in the art will recognize that other options may be employed regarding when to call the de-queue operation 500, and such decisions are external to the design of the DPQ 500 itself.

For at least one embodiment, whether or not all threads have visited a given queue node is determined by query of a count field 122a, 124a, 126a, 128a associated with each node 102, 104, 106, 108 of the DPQ 100. For some embodiments, the count value in the count field 122a, 124a, 126a, 128a may be defined as a simple integer counter that is initialized to the number of threads in the system when a node is added to the DPQ. Worker-threads can decrement this counter using an atomic CAS operation after evaluating their respective sub-ranges. For at least one embodiment, the worker thread that decrements the counter in the counter field (e.g., 122aa) to zero is the worker thread that is to perform the de-queue operation 500 for the node (e.g., 102).

For at least one alternative embodiment, the count field 122a, 124a, 126a, 128a is not included in the DPQ nodes 102, 104, 106, 108. Instead, scheduling of data-parallel tasks using the DPQ 100 may be performed in a system that provides a programming model which provides well defined synchronization points for quiescence. For such embodiments, the count field 122a, 124a, 126a, 128a is not needed. Instead, for such embodiments the first thread to exit the synchronization point may go ahead and perform de-queue operation 500, effectively moving Head 120 to point to the current node in the DPQ 100.

For at least one embodiment, the de-queue operation 500 may be safely performed concurrently with embodiments of the enqueue operation illustrated in FIG. 4 and also concurrently with embodiments of either Pick operation illustrated in FIGS. 8 and 12.

FIG. 5 illustrates that processing for the de-queue operation 500 begins at block 502 and proceeds to block 504. At block 504, a local head pointer 530 is initialized. The initialization copies the contents of the DPQ Head Pointer 120 to the local Head Pointer 530. In this manner, the Local Head Pointer 530 is initialized to point to the current head node 102 of the DPQ 100. The processing of block 504 corresponds to line 2 of Table 4.

Processing proceeds from block 504 to block 506. At block 506, the DPQ Head pointer 120 is modified to point to the next node 104 of the DPQ 100. For at least one embodiment, this operation 506 is performed by setting the address field 120b of the Head Pointer 120 equal to the value in the address field 122b of the Next Pointer 122 for the node 120 to which the Local Head Pointer 530 holds the address in its address field 530b. The effect of such operation is indicated in FIG. 5 by X'ed out line 562 and broken line 564. Line 562 indicates the old value of the address field 120b of the DPQ Head Pointer 120 before the operation at block 506, and dotted line 564 represents the value of 120b after the operation 506. The operation at block 506 corresponds to line 3 of Table 4. As Table 4 indicates, for at least one embodiment the update at block 506 is performed via an atomic CAS operation. Processing then proceeds to block 508.

At block 508, the counter value in the counter field 120a for the Head pointer 120 is incremented. The count field 120a associated with Q_>Head 120 is implemented, for at least one embodiment, as a monotonic-increasing counter, similar to a version number. The counter field 120a is incremented each time the Head pointer 120 is updated. Thus, each update of the Head pointer 120 should result in a unique value for the counter field 120a, which can be checked to confirm consistency. From block 508, processing proceeds to block 510. At block 510, the memory for the deleted node is freed. Processing then ends at block 512.

Figure 6:
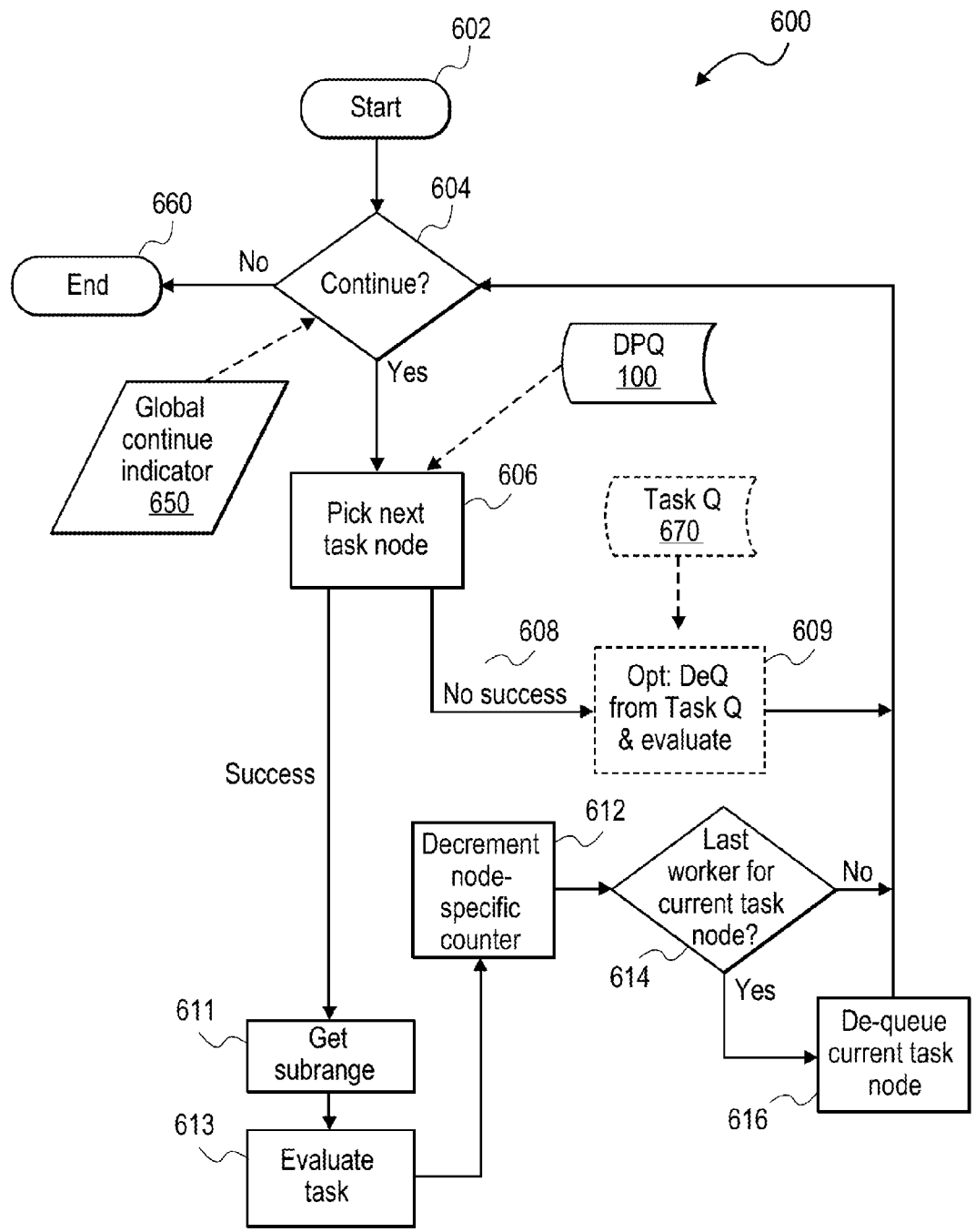
FIG. 6 is a flowchart illustrating at least one embodiment of a method for scheduling data-parallel tasks from a data-parallel queue.

FIG. 6 is a flowchart illustrating at least one embodiment of a method 600 for scheduling data-parallel tasks from a data-parallel queue (such as DPQs 100, 300 illustrated in FIGS. 1, 3, 4 and 5). The method 600 illustrates a process by which a DPQ 100 can be used to implement an efficient, scalable, data-parallel scheduler. Each worker thread picks work from the DPQ 100, and the last thread to participate in a particular data-parallel task de-queues the node after evaluating its sub-task associated with the node.

For illustrative purposes only, a pseudo code representation of a data-parallel scheduling method 600 for a DPQ 100 is set forth in Table 5, below. Table 5 is provided as an example only, and in no way should be taken as limiting the scope of the appended claims.

TABLE 5

Pseudo code for Data-Parallel Scheduler

```
1.   workerThreadScheduler( ){
2.       while (!done) {
3.           task_t task;
4.           if (Pick(dpqueue, &task)){
5.               evaluate(get-subrange(&task));
6.               if (atomic-dec-counter(task) == 1)    /* Optional
7.                   Dequeue(dpqueue);
8.           } else {                                   /* Optional
9.               if (dequeue(taskqueue, &task))        /* Optional
10.                  evaluate(task);                   /* Optional
11.          }
12.      }
13.  }
```

FIG. 6 illustrates that the processing for the method 600 begins at block 602 and proceeds to block 604. For at least one embodiment, the method is performed by a worker thread (see, e.g., Thread 0 through Thread n–1 of FIG. 7). At block 604, the worker thread determines whether it should continue looking for work. For at least one embodiment, block 604 evaluates to true unless a global variable 650 has been set (or re-set) to indicate that no more work should be performed. Such variable 650 may be set, for example, by the "host" thread that previously enqueued the nodes in the DPQ 100. The "host-thread" may use the global variable 650 to indicate that all work is done and/or that program termination is imminent. If the determination at block 604 evaluates to true, processing proceeds to block 606. Otherwise, processing proceeds to block 660.

At block 606, the worker thread performs a "pick" operation on the DPQ 100 to get a reference to a node in the DPQ 100 that the worker thread has not yet processed. The processing at block 606 may include the creation of a local task variable that is passed to the pick operation as a parameter (see Line 3 of Table 5). Line 4 of Table 5 corresponds to execution of the Pick operation at block 606.

If the "pick" operation at block 606 is not successful, the worker thread has no work to do for the current node. This may happen, for example, if the DPQ 100 is empty. A failed pick operation may also occur if there is not enough work to be done for the computation associated with the current node, and the worker thread therefore need not evaluate a sub-task for this node. This latter condition may happen, for example, if the worker thread has already evaluated all nodes in the DPQ 100. A failed pick operation may also occur, for at least one embodiment, when the pick operation 606 is temporarily not possible due to system constraints. Such condition may exist, for example, if the operating system of the computing system has decided to interrupt the pick processing in order to handle an interrupt or other exception. In such case, pick processing could be temporarily pre-empted. For at least one embodiment, failure of the pick operation at block 606 corresponds to Line 8 of Table 3, and path 608 of FIG. 6.

For at least one embodiment, processing proceeds from block 606 to block 604 if the "pick" operation fails. However, for other embodiments processing optionally proceeds to block 609 if the "pick" operation fails at block 606. At block 609, a node of the optional task queue 670 is de-queued, and the associated task is evaluated.

Accordingly, FIG. 6 illustrates that at least one alternative embodiment of the scheduling method 600 of FIG. 6 may also include task-based scheduling. Optional block 609 may be performed, for example, for an embodiment that maintains at least two queue structures: a data-parallel scheduling queue 100 and a task-based scheduling queue 670, which is implemented along the lines of the task-parallel queue 200 shown in FIG. 2. The DPQ 100 may be maintained for tasks that are to be evaluated in a data-parallel manner, and the optional task queue 670 may be maintained for tasks that are to be evaluated by a single worker thread, as illustrated in FIG. 2. Embodiments of the processing of block 609 correspond to Lines 9 and 10 of Table 5.

The optional nature of block 609 and the optional Task queue 370 are denoted in FIG. 3 via broken lines. FIG. 6 thus illustrates that worker threads begin the method 600 of FIG. 3 by looking for work in the DPQ 100. If the pick by the worker thread at block 606 is not successful, the worker thread may then look (block 609) at the task-parallel queue 670 for a task that the thread can evaluate before returning to block 604, where it may again scan the DPQ 100. While the order of processing illustrated in FIG. 6 is biased toward performing data-parallel work before looking for task-parallel work, one of skill in the art will recognize that this bias may be easily reversed by changing the order of operations shown in FIG. 6 to evaluate the task-parallel queue 670 before evaluating the data-parallel queue 100.

If the "pick" operation at block 606 is successful, processing proceeds to block 611. At block 611, a data-parallel sub-task associated with the node that has been picked is selected by the worker thread. To do this, the worker thread performs a get_range operation to identify the unique sub-range of data for which it should evaluate the task indicated by the current node of the DPQ 100.

The method 600 illustrated in FIG. 3 is non-blocking since a get_subrange operation illustrated at block 611 can be implemented in a lock-free manner. For example, one embodiment of a get_subrange function performed at block 611 may use a simple thread-partitioning scheme such that each worker thread is assigned a particular sub-task range for every pick. Such simple get_range processing 611 is discussed in further detail below in connection with FIG. 7.

Figure 7:
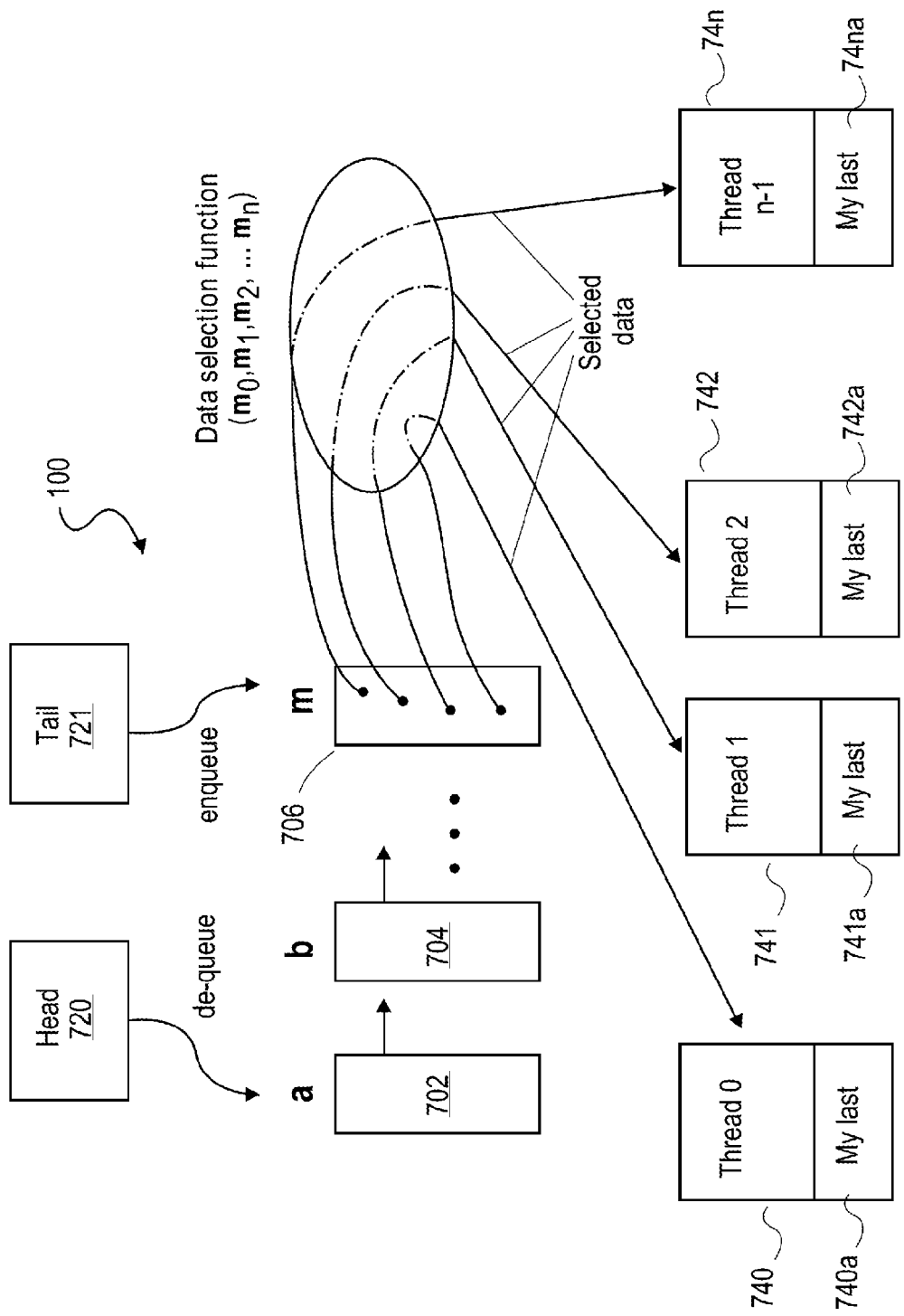
FIG. 7 is a block data flow diagram illustrating at least one embodiment of a method for assigning a data-parallel sub-task during pick of a node of a data-parallel queue by a worker thread.

Turning briefly to FIG. 7, shown is a block diagram illustrating at least one embodiment of the get_range processing that may be performed at block 611 of FIG. 6. FIG. 7 shows that the various sub-tasks ($m_0$, m1, m2, mn) for a node 706 are assigned to worker threads 740, 741, 742, 74n. For at least one embodiment, the assignment of sub-tasks to worker threads is performed dynamically, via data selection function 710. This approach is a useful contrast, for programmers, to many known systems that map a particular thread to a particular sub-task a priori. FIG. 7 illustrates that, instead, the processing of 611 assigns a sub-task to a worker thread during real-time execution of the function 710.

FIG. 7 illustrates a throughput-oriented approach for mapping an indexed space onto the available number of worker threads during execution (rather than an a priori approach). FIG. 7 illustrates, for example, that the task indicated by the reference in the value field (e.g., 125, 127, 129 of FIG. 5) of a node 706 is indexed into sub-tasks ($m_0$, $m_1$, $m_2$, $m_n$) and that each of the sub-tasks is mapped to a worker thread 740-740n during execution of data selection function 710. For at least one embodiment, identifying and mapping a unique sub-task for evaluation by a worker thread is performed by function 710 in a lock-free manner by identifying chunks of data to be processed for a task using the worker-thread's thread id. For example, since each worker-thread operates on a distinct sub-range of data, at least one embodiment of the function 710 can identify chunks of data to be processed using the worker-thread's thread id.

Returning now to FIG. 6, it is seen that processing proceeds to block 613 from block 611. At block 613, the assigned data-parallel sub-task for the current node of the DPQ 100 is evaluated. The processing of blocks 611 and 613 correspond to Line 5 of Table 5.

For at least one embodiment, the current worker thread may opt out of evaluation for the current node of the DPQ 600, and thus opt out of the processing of blocks 611 and 613. As is stated above, even though every work thread "picks" each task node of the DPQ 600 at block 606, the worker thread may nevertheless opt out of evaluation of a sub-task for the node. For example, the worker thread may opt out of evaluation of work for the current node, at block 360, if there is not enough work to be done in the particular computation. In such case, processing proceeds directly to block 612 from block 606.

From block 613, processing proceeds to block 612. At block 612, the counter field (see, e.g., 124a of FIG. 1) for the node is decremented to indicate that an additional worker thread has picked the node (during block 606). The counter field thus keeps track of the number of sub-tasks that have been evaluated for the current node. Such processing may be performed, for at least one embodiment, to address the "ABA" issue: if a process reads a value A in a shared location, computes a new value, and then attempts a compare and swap operation, the compare and swap may succeed when it should not, if between the read and the compare and swap some other process(es) change the A to B and then back to A again.

Processing proceeds from block 612 to 614. At block 614, it is determined whether the node should be de-queued. That is, it determined whether all sub-tasks have been performed for the node. For at least one embodiment, such determination is made based on the value of the counter field (see, e.g., 122b, 124b, 126b of FIG. 1). Line 6 of Table 5 illustrates at least one embodiment of the determination at block 614. Line 6 of Table 5 illustrates a single instruction that performs the processing of Blocks 612 and 614, but one of skill in the art will recognize that the operations could be performed by separate instructions. Line 6 illustrates that an atomic decrement instruction is performed in order to decrement the counter value in the counter field (e.g., 124b, of FIG. 1) for the node, and proceeds to block 616 if the CAS-based instruction at Line 6 returns a value of "1", indicating that value in the counter field was a 1 before the decrement, and is now zero. In such case, processing proceeds to block 616. If, instead, the evaluation at block 614 evaluates to "false", (e.g., the value returned at Line 6 is not a "1") then processing returns to block 604.

At block 616, the current node is de-queued (see discussion above regarding FIG. 5). Embodiments of the processing of block 616 correspond to Line 7 of Table 5. From block 616, processing returns to block 604.

Regarding the counter, block 612 illustrates at least one embodiment, wherein the counter is decremented at block 612 with a simple atomic compare-and-swap instruction in order to avoid contention with other threads. For at least one alternative embodiment, other more scalable counter implementations may be used.

Blocks 612 and 614 of FIG. 6, as well as Line 6 of Table 5 thus illustrate that the counter (see 124b of FIG. 1) is used to determine whether a worker thread should de-queue a node. For at least one other embodiment, no counter need be used at all. For such embodiment, instead of decrementing the counter at block 612, the node performs a barrier synchronization such that the last processor to hit the barrier de-queues the task at block 616, the synchronization barrier taking the place of the counter processing at blocks 612 and 614. For yet another embodiment, the de-queue of the node at block 616 is delayed until all thread units (i.e., a processor or core on which a worker thread is executing) perform a barrier synchronization outside of a kernel (e.g., quiesce every so often). For such embodiments, the counter is not needed in order to address the ABA problem. Instead, the barrier synchronization embodiments only lazily de-queue a node after all sub-tasks have been performed, and it is guaranteed that worker threads will no longer reference the node. Thus, the ABA problem is alleviated for such alternative embodiments.

Figure 8A:
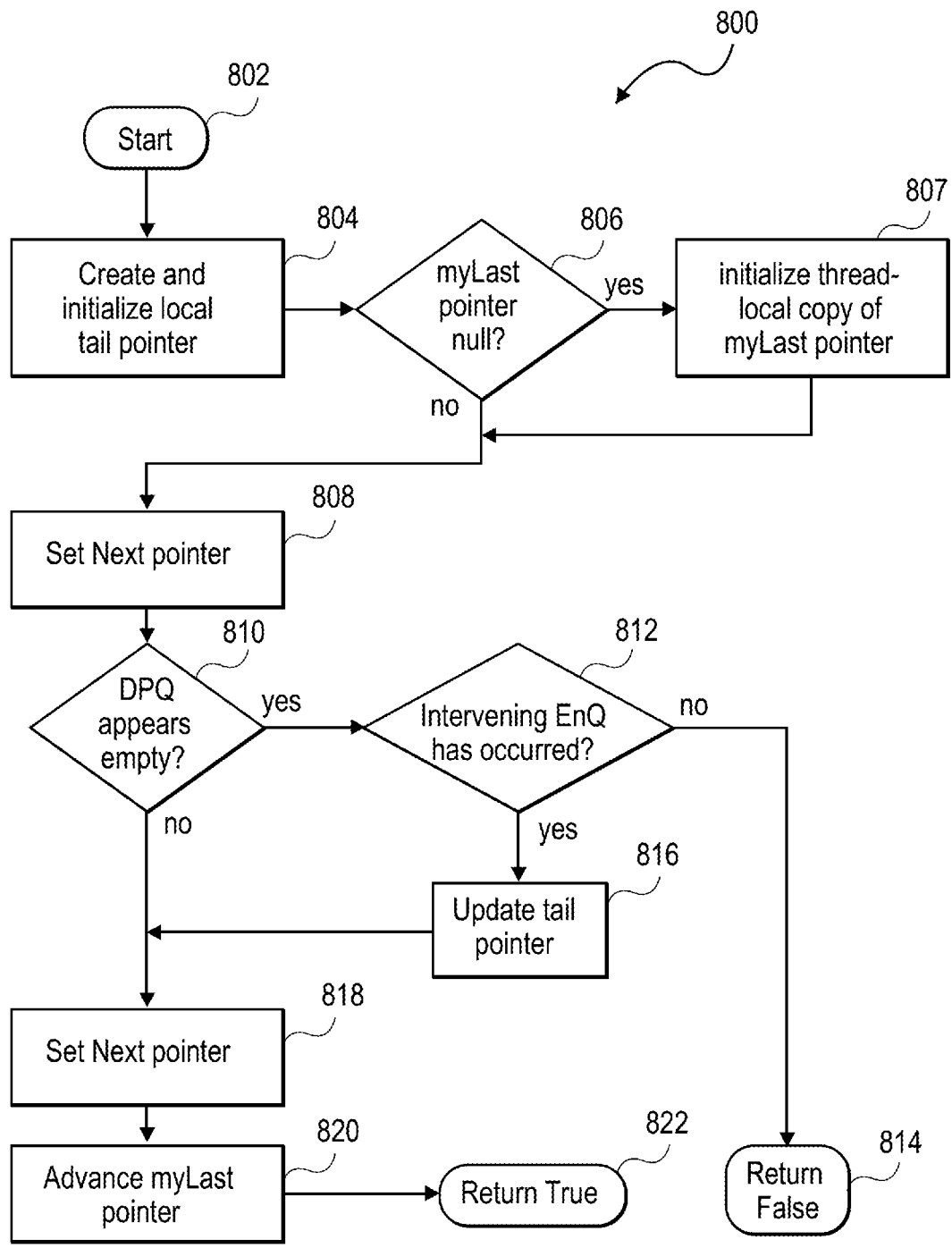
FIG. 8A and FIG. 8B, is a flowchart and block diagram, respectively, illustrating at least one embodiment of a method for selecting from a data-parallel queue a task from a node not yet visited by a worker thread.
Figure 8B:
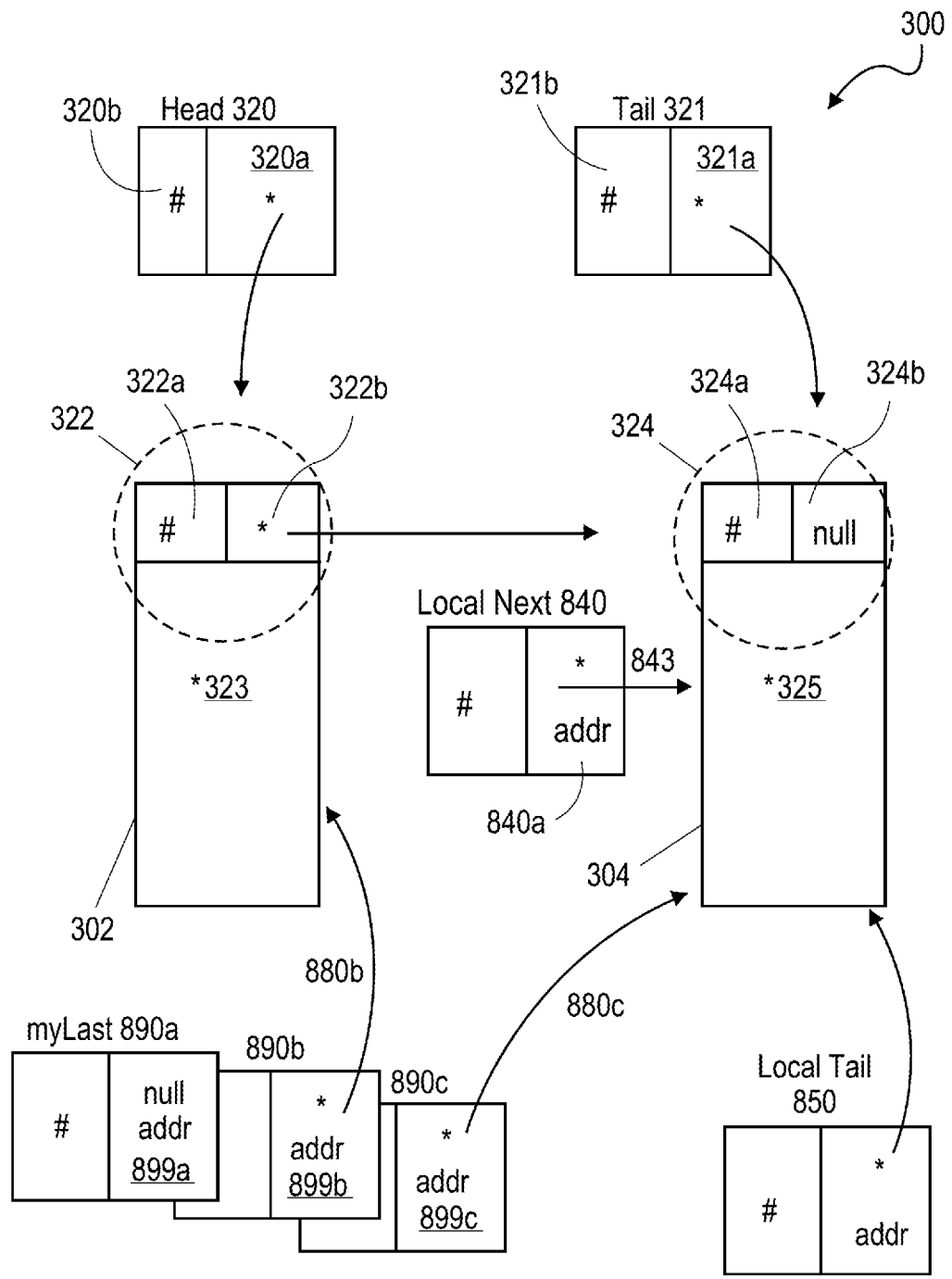

FIG. 8 includes a flowchart (FIG. 8A) and block diagram (FIG. 8B) illustrating at least one embodiment of a pick operation 800 that may be performed, for example, at block 606 of FIG. 6. Generally, the method 800 provides a mechanism by which a worker thread can read from the DPQ 300 a value from a queue node (e.g., 304) that the worker thread has not seen before. For at least one embodiment, the Pick operation 800 may be implemented as a function with two arguments. The first argument is a reference to a DPQ 300 (e.g., the queue from which the worker thread is to attempt to pick a data-parallel chunk of work, also referred to herein as a "sub-task"). The second argument is null when the pick operation is initiated. If successful, the pick operation 800 sets the second argument to a reference to a node of the DPQ 300. For at least some embodiments, the method 800 is implemented as a Boolean pick function that returns either a true or false value. If the pick operation 800 is successful, the pick function returns a "true" value and also sets as the value of the second argument a reference to a node of the DPQ 300. For illustrative purposes only, a pseudo code representation of a pick operation for the DPQ 300 is set forth in Table 6, below. Table 6 is provided as an example only, and in no way should be taken as limiting the scope of the appended claims.

TABLE 6

Pseudo code for Wait-Free Pick of DPQ Node

| | |
|---|---|
| 1. | thread_local Node* myLast = NULL; |
| 2. | bool Pick (DPQueue *Q, void** value) { |

TABLE 6-continued

Pseudo code for Wait-Free Pick of DPQ Node

| | |
|---|---|
| 3. | tail = Q->Tail; |
| 4. | if (myLast == NULL) myLast = Q->Head.addr; |
| 5. | next = myLast->next; |
| 6. | if (myLast == tail.addr){ |
| 7. | if (next.addr == NULL) return FALSE; |
| 8. | CAS(&Q->Tail, tail, <next.addr, tail.count+1>); |
| 9. | } |
| 10. | *value = next.addr->value; |
| 11. | myLast = next.addr; |
| 12. | return TRUE; |
| 13. | } |

The method 800 illustrated in FIG. 8 is lock-free, in the sense that the pick operation 800 will finish in a finite number of steps as long as no worker-thread is pre-empted indefinitely or starves. For at least one embodiment, the method 800 is performed in a system that provides a starvation-free, fair, user-level thread scheduler.

FIGS. 7 and 8 are referenced together for a more detailed discussion of certain aspects of the pick operation 800 processing. For at least one embodiment of the pick operation 800, it is assumed that prior to the first execution of the pick operation 800 by a worker thread, the worker thread (e.g., worker threads 740-74n of FIG. 7) that is attempting to pick work from the DPQ queue 100, 300 has previously created a thread-local variable 890, called myLast (see also, e.g., myLast 740a, 741a, 742a, 74na of FIG. 7). The purpose of the myLast variables is to track the last node of the DPQ 100, 300 that the worker thread has successfully picked. For at least one embodiment, the address field 899 of My Last (740a, 741a, 742a, 74na) is initialized to a null value prior to the first iteration of the pick operation 800. As the discussion below makes clear, the worker thread uses the value in this "my last" variable 890 to avoid picking the same node of a DPQ 100 twice.

For simplicity, only one DPQ 100 is illustrated in FIG. 7, and only one My Last value 740a-74na is illustrated in FIG. 7 for each node of the DPQ 100. However, for at least one embodiment, a separate "my last" value is maintained by a worker thread for each DPQ in the system. The "my last" value is set to a default null value upon creation (see Line 1 of Table 6), may be updated during processing of the pick operation 800, and is maintained through subsequent executions of pick operation method 800.

Putting aside FIG. 7, FIG. 8 illustrates that the method 800 begins at block 802 and proceeds to block 804. At block 804, a local working copy 850 of the tail pointer 321 of the DPQ 300 is created. The processing of block 804 corresponds to Line 3 of Table 6. Processing then proceeds to block 808.

The first time through the method 800, after system initialization, by a particular worker thread for a particular DPQ 300, the address field 899a of the myLast pointer 890 created at Line 1 of Table 6 will still be null. Such condition is evaluated at block 806. If it is determined that the value in the address field 899 of the myLast pointer 890 for the current worker thread is null for the current DPQ 300, then one of two conditions exists. Either a) the worker thread has not yet tried to traverse through any nodes of the DPQ 300 or b) the worker thread has traversed all the way through the DPQ 300 already. In either event, the evaluation at block 806 evaluates to "true" and processing proceeds to block 807. Otherwise, processing proceeds from block 806 to block 808. For purposes of the example illustrated in FIG. 8, the initial null value of the myLast pointer 890 is represented by the null value in an initial version 899*a* of the address field of an initial version 890*a* of the myLast pointer.

At block 807, the myLast pointer 890 is initialized to the head pointer 320 for the DPQ 300. In such manner, the myLast pointer 890 is initialized to point to the first node of the DPQ 300. Embodiments of such processing of blocks 806 and 807 correspond to Line 4 of Table 6. For purposes of the example illustrated in FIG. 8, the value of the myLast pointer after the processing of block 807 (and Line 4 of Table 6) is represented by the pointer value 880*b* in the address field 899*b* in a subsequent version 890*b* of the myLast pointer. Such pointer value 880*b* points to the same node (302) as the head pointer 320. From block 807 processing then proceeds to block 808.

At block 808, a local Next pointer 840 is set to the value of myLast->next 322. In such manner, the Next pointer 840 points to the next node 304 of the DPQ 300; this node 304 may have a valid task reference associated with it. Embodiments of the processing of block 808 are represented by Line 5 of Table 6. For purposes of the example illustrated in FIG. 8, the value of the address field 840*a* for the local Next pointer 840 after the processing of block 808 (and Line 5 of Table 6) is represented by the line 843 that points to node 304. From block 808 processing then proceeds to block 810.

At block 810, it is determined whether the DPQ 300 appears empty. For at least one embodiment, the processing of block 810 corresponds to Line 6 of Table 6. The current value of myLast 890*b* is compared with the Tail pointer 321. If myLast 890 equals the Tail pointer 321, then they point to the same node. If they are equal, and if this is the first time through the method 800 for a worker thread, this means that, effectively, the tail and head pointers could be pointing to the same value (remember that myLast 890*b* was set to the value of the Head pointer 320 at block 807). As such, the queue 300 appears to be empty. This means that a) the queue is empty and both myLast 890 and Tail pointer 321 point to the first (dummy) node 302 of the DPQ 300, OR that b) the tail pointer has fallen behind and there really are more nodes but the Tail pointer 321 needs to be updated.

If it is not the first time through the method 800 for a worker thread, then the last node picked by the worker thread (as reflected in the current value 890*b* of myLast) is the last node in the queue. In such case, the worker thread has already picked all nodes of the DPQ 300, and there is no work for the current worker thread to perform. If the DPQ 100 really is empty, or if the worker thread truly has already picked all nodes of the queue 100, then the Pick operation will fail, because there is no further work for the current worker thread to perform.

However, if the queue appears to be empty at block 810, it may be that the queue is not really empty, but instead that the Tail pointer 321 has fallen behind. That is, another thread may have enqueued a new node during the current worker thread's execution of the method 800. Accordingly, if block 810 evaluates to "true", processing proceeds to block 812, where it is determined whether an intervening enqueue to the DPQ 100 by another worker thread has occurred.

At block 812, it is determined whether the value of the address field 840*a* of the local Next pointer 840 is null. If so, then either condition a) or b) above is true, and the Pick processing 800 should fail. Accordingly, processing proceeds from block 812 to block 814 if the DPQ 300 contains no work for the current worker thread. At block 814, the pick operation fails and returns a "false" value. Embodiments of block 812 and block 814 correspond to Line 7 of Table 6.

Otherwise, processing proceeds to block 816. If myLast 890*b* equals Tail pointer 321 but Next 840 is not determined to be null at block 812, then the Tail pointer 321 has fallen behind. Accordingly, at block 816 the Tail pointer 321 is updated. Embodiments of the processing of block 816 correspond to Line 8 of Table 6. Line 8 of Table 6 shows that, for at least one embodiment, the update of the Tail pointer 321 is performed via an atomic CAS instruction. Line 8 shows that the value of the address field 321*a* of the Tail pointer 321 is updated to the value of the address field 840*a* of the Next pointer 840. Processing then proceeds to block 818.

At block 818, the worker thread reads the contents of the "value" field 325 of the node 304 pointed to by the Next pointer 840. This value is returned as the value parameter for the Pick operation 800 (see parameters identified at Line 2 of Table 6). Embodiments of the processing of block 818 correspond to Line 10 of Table 6. Processing then proceeds to block 820.

At block 820, the address field 899 for the myLast pointer 890 is advanced. Embodiments of the processing of block 820 corresponds to Line 11 of Table 6. For at least one embodiment, at block 820 the address field 899 of the myLast pointer 890 is set to the value of the address field 840*a* of the Next pointer 840. For purposes of the example illustrated in FIG. 8, the value of the address field 899*c* for the myLast Pointer 890*c* after the processing of block 820 (and Line 11 of Table 6) is represented by the line 880*c* that points to node 304.

From block 820, processing proceeds to block 822, where a "true" value is returned for the Pick operation 800. The processing of block 820 corresponds to Line 12 of Table 6.

The pick operation 800 discussed in connection with FIG. 8 is wait-free. That is, in a system where worker threads evaluate mutually exclusive sub-tasks in a data-parallel computation, the worker threads do not need to synchronize with each other when traversing the DPQ 300. This wait-free aspect of the FIG. 8 method is manifested, at least in part, at Lines 4, 5, and 6 of Table 6 and corresponding blocks 808, 810 and 812 of FIG. 8. When scanning the DPQ 300, the worker thread begins at the last node of the DPQ 300 that it has previously picked, rather than beginning at the head of the DPQ 300. If that node is not the last node in the queue, the worker thread reads the value of the next node and advances its myLast pointer. Thus, the only time the pick operation 800 of FIG. 8 fails is if the DPQ 300 is empty or if the worker thread has already visited all the nodes of the DPQ 100. In contrast, FIG. 12 illustrates an alternative embodiment of a pick operation 1200 that is not wait-free.

Figure 12A:
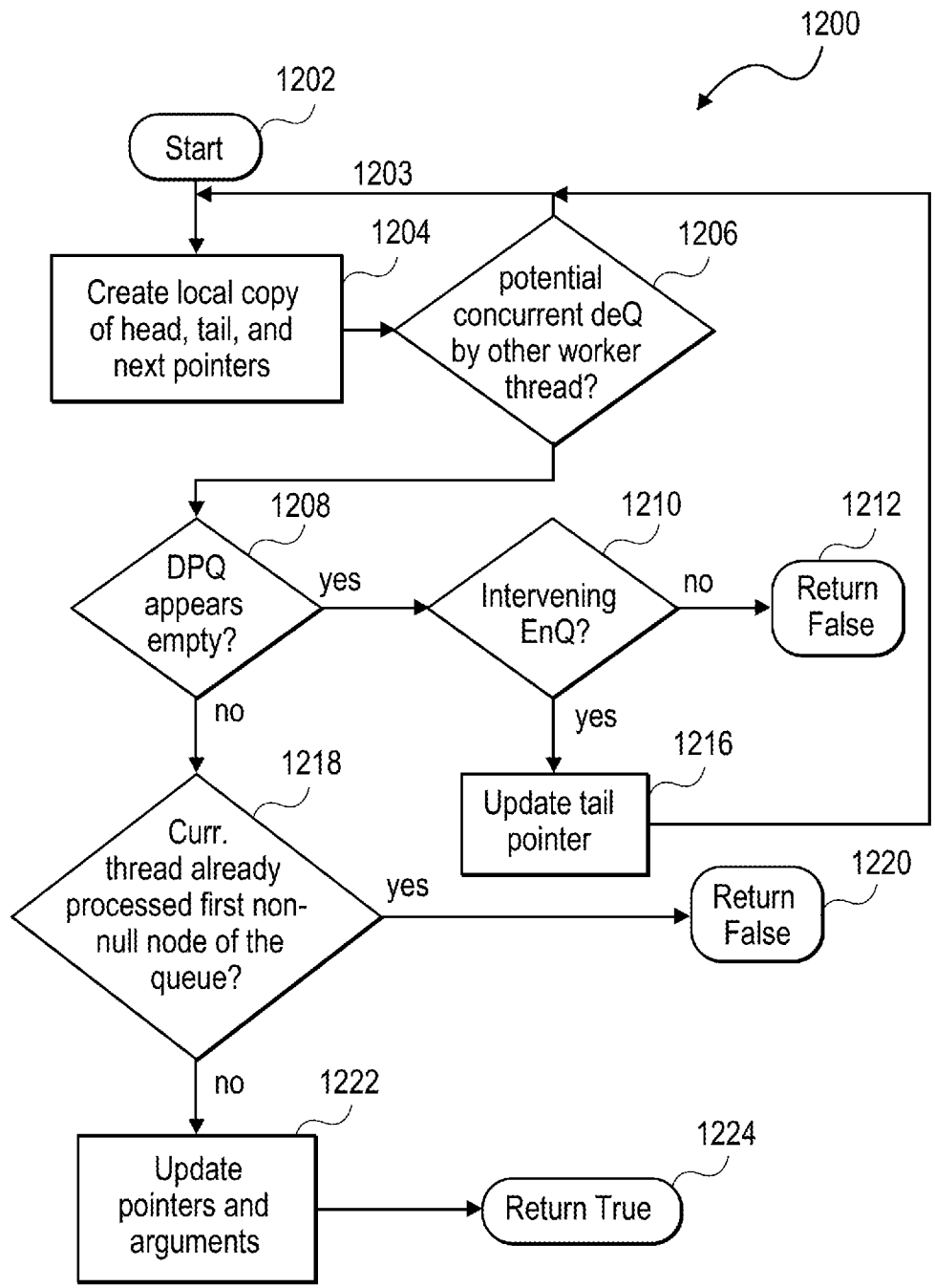
FIG. 12A and FIG. 12B, is a flowchart and block diagram, respectively, illustrating at least one other embodiment of a method for selecting from a data-parallel queue a task from a node not yet visited by a worker thread.
Figure 12B:
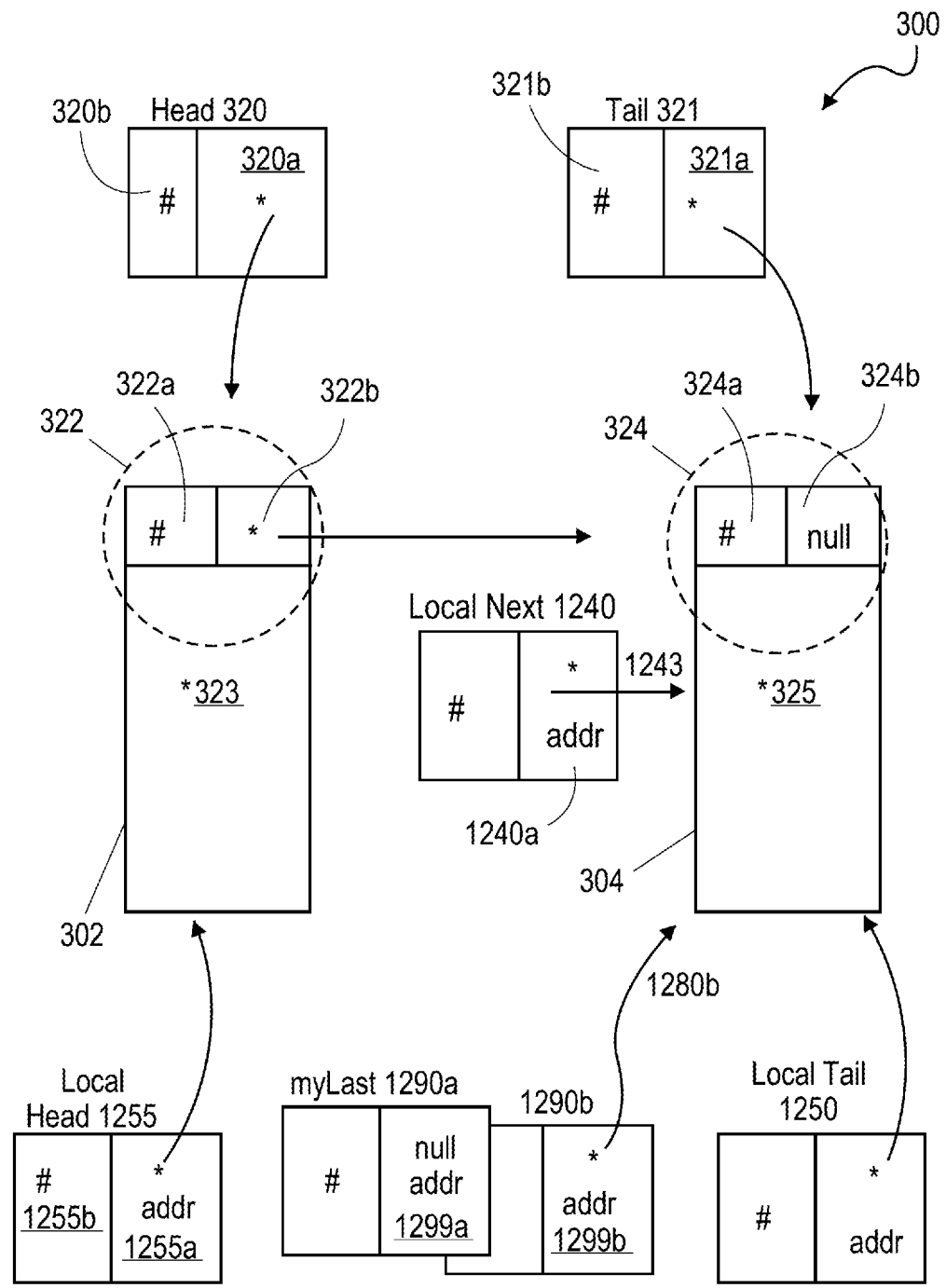

FIG. 12 includes a flowchart (FIG. 12A) and block diagram (FIG. 12B) illustrating at least one alternative embodiment of a pick operation 1200 that may be performed, for example, at block 606 of FIG. 6. Generally, the method 1200, like method 800 discussed above, provides a mechanism by which a worker thread can read from the DPQ 300 a value from a queue node (e.g., 304) that the worker thread has not seen before. As with Pick operation 800 discussed above in connection with FIG. 8, the Pick operation 1200 illustrated in FIG. 12 may be implemented as a function with two arguments. For illustrative purposes only, a pseudo code representation of a pick operation for the DPQ 300 is set forth in Table 7, below. Table 7 is provided as an example only, and in no way should be taken as limiting the scope of the appended claims. The pseudo code of Table 7 indicates, although it is not expressly represented as such in FIG. 12, that the processing of the pick operation 1200 may be implemented as an infinite loop that is exited only upon one of the three terminal conditions 1212, 1220, 1224 illustrated in FIG. 12.

TABLE 7

Pseudo code for Simple Pick of DPQ Node

```
1.   thread_local Node* myLast = NULL;
2.   bool Pick (DPQueue *Q, void** value){
3.       while (1){
4.           Pointer head = Q->Head;
5.           Pointer tail = Q->Tail;
6.           Pointer next = head.addr->next;
7.           if (head.count != Q->head.count) continue;
8.           if (head.addr == tail.addr){
9.               if (next.addr==NULL) return FALSE;
10.              CAS(&Q->tail, tail, <next.addr,tail.count+1>);
11.              continue;
12.          }
13.          if (myLast == next) return FALSE;
14.          break;
15.      }
16.      myLast = next;
17.      *value = next.addr->val;
18.      return TRUE;
19.  }
```

Line 2 of Table 7 indicates that, as with the wait-free pick 800 illustrated in FIG. 8, the pick operation 1200 includes two parameters: a reference to a DPQ 100 (e.g., the queue from which the worker thread is to attempt to pick a data-parallel chunk of work, also referred to herein as a "sub-task") and a value, which is null when the pick operation 1200 is initiated. If successful, the pick operation 1200 sets the second argument to a reference to a node of the DPQ 300. The function returns either a true or false value. If the pick operation 1200 is successful, the pick function returns a "true" value and also sets as the value of the second argument a reference to a node of the DPQ 300. In this manner, the pick operation 1200 enables a worker thread to read a value from a queue node that it has not seen before.

As with the wait-free pick operation 800 illustrated in FIG. 8, the pick operation 1200 illustrated in FIG. 12 keeps track of the last node it has picked in a thread local myLast variable 1290. Line 1 of Table 7 illustrates that the myLast variable 1290 is created before the pick processing 1200 begins, and is initialized to a value of null. The myLast variable 1290a illustrates the state of the myLast variable after the processing at Line 1 of Table 7.

The pick operation 1200 uses this variable 1290 to make sure it doesn't pick the same node twice. However, as is discussed in more detail below, the pick operation 1200 of FIG. 12 always attempts to read from the first non-dummy queue node (e.g., node 34), which is the second node in a non-empty queue. This contrasts sharply with the processing of the wait-free pick operation 800 illustrated in FIG. 8, where the worker thread instead tries to read the next node after the node pointed to by the myLast variable 1290.

FIG. 12 illustrates that processing for pick operation 1200 begins at block 1202 and proceeds to block 1204. At block 1204, local copies the head and tail pointers are created, as well as a local next pointer. FIG. 12 illustrates that the local head pointer 1255 is initialized to the value of the Head pointer 320 of the DPQ 300. Embodiments of this processing of block 1204 correspond to Line 4 of Table 7. FIG. 12 illustrates that a local head pointer 1255 points to the dummy node 302 at the head of the DPQ 300 after such operation. Also at block 1204, a local tail pointer 1250 is initialized to the value of the Tail pointer 321 of the DPQ 300. Embodiments of this processing of block 1204 correspond to Line 5 of Table 7. FIG. 12 illustrates that the local tail pointer 1250 points to node 304 after such operation. Finally, at block 1204 a local next pointer 1240 is created and initialized to the value of the next field 322 for the node 302 pointed to by the address field 1255a of the local head pointer 1255. Embodiments of this processing of block 1204 correspond to Line 6 of Table 7. FIG. 12 illustrates that the value 1243 in the address field 1240a of the next pointer 1240 points to node 304 of the DPQ 300 after such operation. From block 1204, processing proceeds to block 1206.

At block 1206, processing is performed to account for potential concurrent de-queue by other worker threads. At least one embodiment of the processing of block 1206 corresponds to line 7 of Table 7. At Line 7 of Table 7, it is determined whether the count field 1255b of the local head pointer 1255 is consistent with the count field 320b for the Head pointer 320 of the DPQ 300. If not, then some event has occurred to change the count field 320b of the Head pointer 320 since the local copy was made at block 1204 (see, e.g., Line 4 of Table 7). For at least one embodiment, it is assumed that the event that caused the discrepancy was an intervening de-queue operation by another worker thread. In case of such discrepancy, processing then proceeds from 1206 to back to block 1204 along path 1203, where a new value for the local copy of the head pointer will be established at block 1204.

If, on the other hand, the evaluation at block 1206 indicates that the local and global head pointers still match, then processing proceeds to block 1208. At block 1208, a check is made to determine whether the DPQ 300 appears to be null. The processing of block 1208 is similar to the processing described above in connection with block 810 of FIG. 8. At least one embodiment of the processing of block 1208 corresponds to Line 8 of Table 7. If the local head pointer 1255 and the local tail pointer 1250 point to the same node at block 1208, then either the DPQ 300 is empty or the Tail pointer 321 has fallen behind. Processing proceeds to block 1210 of processing if block 1208 evaluates to "true". Otherwise, processing proceeds to block 1218.

If an intervening de-queue has occurred, then the DPQ 300 is not empty. To check for a truly empty queue at block 1210, it is determined whether the address field 1240a of local next pointer 1240 is null. If so, the DPQ 300 is truly empty, and processing ends at block 1212, where the pick operation 1200 returns a false value. Embodiments of the processing of blocks 1210 and 1212 correspond to Line 9 of Table 7.

If the processing of block 1210 evaluates to "false", then the head and tail pointers point to the same node, but the DPQ 300 is not null. In this case, it is assumed that the DPQ Tail pointer 321 has fallen behind due to an intervening enqueue operation by another worker thread, and processing proceeds to block 1216. At block 1216, the DPQ Tail pointer 321 is updated. Embodiments of the processing of block 1216 correspond to Line 10 of Table 7. From block 1216, processing returns to block 1204 (See Line 11 of Table 7).

At block 1218, it has already been determined at block 1208 that the DPQ 300 is not empty and that the DPQ Tail pointer 321 has not fallen behind. Thus, the local next pointer 1240 points to a node that may be a candidate for evaluation. It is determined at block 1218 whether the current worker thread has already picked the current node. This processing 1218 differs from the processing of the wait-free pick operation illustrated in FIG. 8. For block 1218, a comparison is made between value of the current myLast pointer 1290a and the value of the local next pointer 1240. An embodiment of such processing corresponds to Line 13 of Table 7. Because the local Next pointer 1240 has been initialized at block 1204 based on the local Head pointer 1255 (rather than being based on myLast as in block 808 of FIG. 8, the evaluation at block 1218 evaluates to "true" if the current worker thread has already seen the value of the first non-dummy node of the queue. In such case, processing proceeds to block 1220, where a "false" value is returned for the pick operation 1200.

This processing at blocks 1218 and 1220 of FIG. 12 differs greatly from the processing of the wait-free pick operation 800 illustrated in FIG. 8. In particular, the pick operation of FIG. 8 is wait-free because each worker thread may traverse the DPQ 300 independently of the other thread working on the DPQ 300, and thus makes progress at every step. In contrast, because the pick operation of FIG. 12 fails 1220 if it has already picked the first non-dummy node of the DPQ 300, it cannot make progress until every other worker thread has picked the node 304, and the node has been de-queued. In this sense, a worker thread's progress for method 1200 is gated by the progress of the other threads working on the DPQ 300, and the worker thread may be required to "wait" for the other threads.

Otherwise, if the evaluation at block 1218 evaluates to "false", the pick operation 1200 is successful. In such case, processing proceeds to block 1222. At block 1222, pointers and arguments are updated for the successful pick. The processing of block 1222 corresponds to Lines 16-17 of Table 7. At block 1222, the value of myLast 1290 is updated to reflect the value of the next pointer 1240. For the example in FIG. 12, myLast 1290*b* illustrates the value of the myLast variable 1290 after the processing of block 1222. For the example, the address field 1299*b* of myLast 1290*b* now points to node 304 of the DPQ 300. Line 17 of Table 7 illustrates that the value parameter for a successful pick operation is set at block 1222, for at least one embodiment, to the value of the value field 325 of the successfully picked node 304. Processing then proceeds to block 1224. At block 1224, which corresponds to Line 18 of Table 7, a true value is returned for the Boolean pick operation 1200.

The methods, systems, and mediums described herein are for scheduling data parallel tasks onto multiple thread execution units of processing system. Embodiments described above may be implemented in many different system types. For at least some embodiments, the discussion above describes various approaches for supporting efficient execution of fine-grained data parallel workloads in the context of a runtime based on a CPU (Central Processing Unit). Scheduling of fine-grained computations on a CPU-based platform is a non-trivial challenge because many such CPUs lack specialized hardware features as seen in GPUs (Graphics Processing Units) and hardware accelerators. GPU hardware is specialized for fine-grained data parallel execution through hardware support for a large number of light-weight GPU threads along with efficient context-switching and synchronization mechanisms. For example, GPUs may provide hardware assists for task-picking and scheduling. While GPUs and hardware accelerators provide hardware features to enable such scheduling, on a multi-core CPU platform without such hardware features, such scheduling is performed in software. Various embodiments of such CPU-based platforms are discussed below in connection with FIGS. 9, 10 and 11.

The thread execution units of such platforms 900, 1000, 1100, may be discrete cores in a system that includes multiple cores. Such cores may be single-threaded cores. Alternatively, the multiple cores may themselves be multi-threaded cores. For at least one other embodiment, the multiple thread units may be implemented in a system as a combination of single-threaded and multi-threaded cores.

For at least one embodiment, the multiple thread units may be implemented as multiple logical processors in a single same physical core. Such multithreaded cores may be, for example, cores that have multiple logical processors to implement simultaneous multithreading and/or cores that implement a hybrid of simultaneous multithreading that also replicates some execution resources (e.g., integer execution units), such as cluster-based multithreading.

Figure 9:
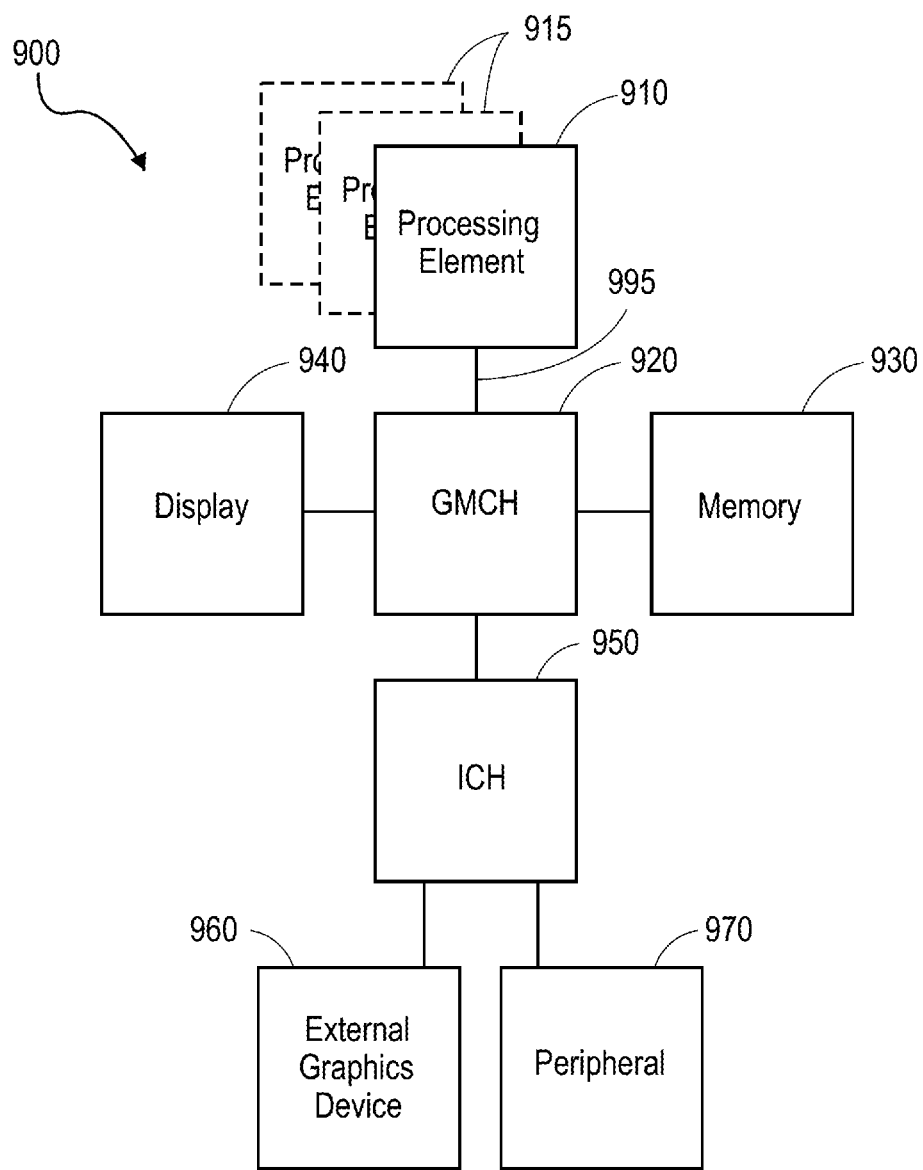
FIG. 9 is a block diagram illustrating at least one embodiment of a processor including multiple processing elements capable of executing multiple software threads concurrently.

Referring to FIG. 9, shown is a block diagram of an embodiment of a system 900 capable of executing multiple threads concurrently. Processor 900 includes any processor, such as a micro-processor, an embedded processor, a digital signal processor (DSP), a network processor, or other device to execute code. Processor 900, as illustrated, includes a plurality of processing elements.

As shown in FIG. 9, the system 900 may include one or more processing elements 910, 915, which are coupled to graphics memory controller hub (GMCH) 920. The optional nature of additional processing elements 915 is denoted in FIG. 9 with broken lines.

Each processing element may be a single core or may, alternatively, include multiple cores. Each of the cores of the processing element may be a single-threaded core. The processing elements may, optionally, include other on-die elements besides processing cores, such as integrated memory controller and/or integrated I/O control logic. Also, for at least one embodiment, the core(s) of the processing elements may be multithreaded in that they may include more than one hardware thread context per core.

FIG. 9 illustrates that the GMCH 920 may be coupled to a memory 940 that may be, for example, a dynamic random access memory (DRAM). For at least one embodiment, the memory 940 may include instructions or code that comprise an operating system and one or more schedulers.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 500. For at least one embodiment, the GMCH 920 communicates with the processor(s) 910, 915 via a multi-drop bus, such as a frontside bus (FSB) 995.

Furthermore, GMCH 920 is coupled to a display 940 (such as a flat panel display). GMCH 920 may include an integrated graphics accelerator. GMCH 920 is further coupled to an input/output (I/O) controller hub (ICH) 950, which may be used to couple various peripheral devices to system 500. Shown for example in the embodiment of FIG. 9 is an external graphics device 960, which may be a discrete graphics device coupled to ICH 950, along with another peripheral device 970.

Alternatively, additional or different processing elements may also be present in the system 900. For example, additional processing element(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processing element. There can be a variety of differences between the physical resources 910, 915 in terms of a spectrum of metrics of merit including architectural, microarchitectural, thermal, power consumption characteristics, and the like. These differences may effectively manifest themselves as asymmetry and heterogeneity amongst the processing elements 910, 915. For at least one embodiment, the various processing elements 910, 915 may reside in the same die package.

Figure 10:
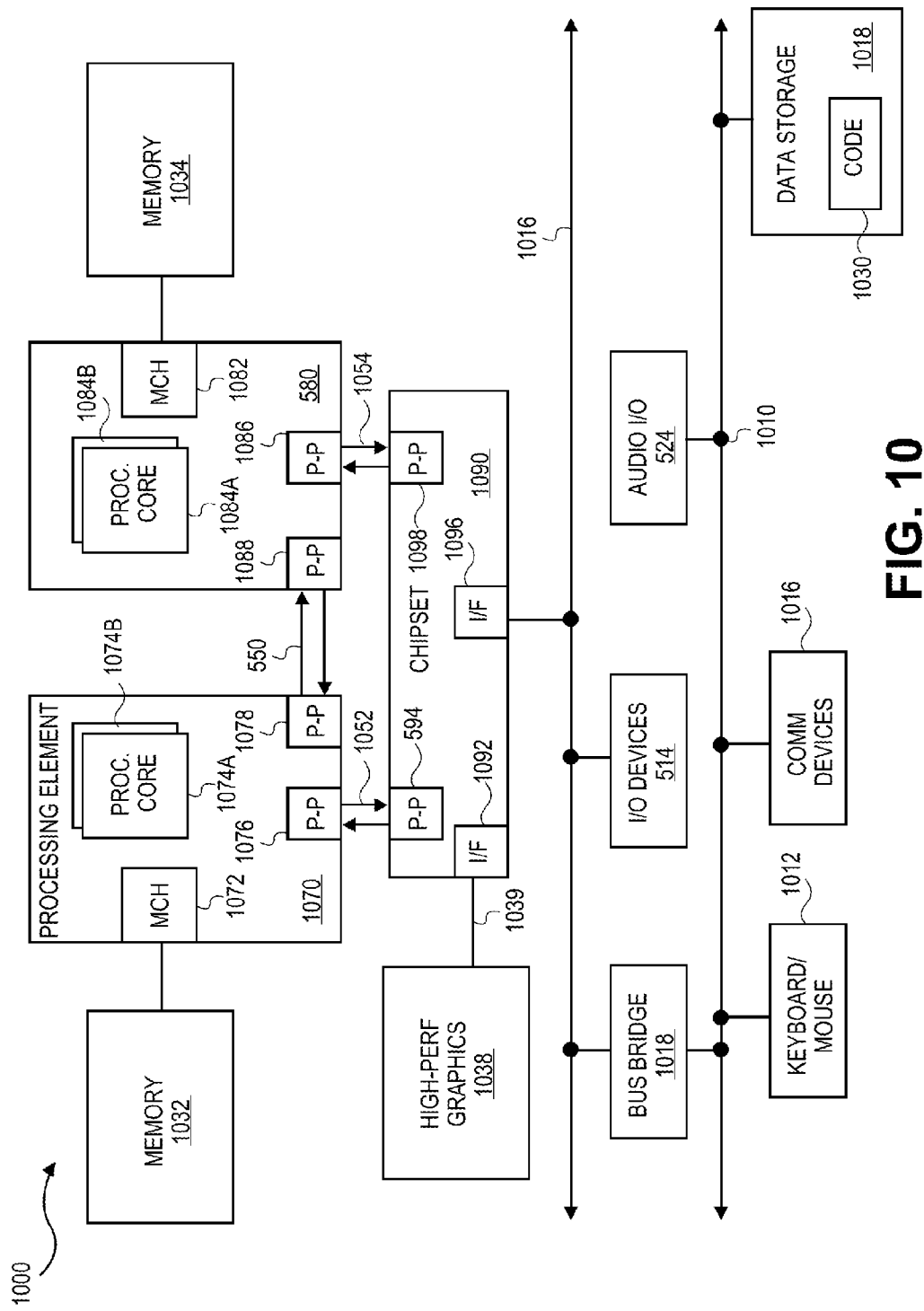
FIG. 10 is a block diagram in accordance with at least one embodiment of a system including multiple processing elements capable of executing multiple software threads concurrently.

Referring now to FIG. 10, shown is a block diagram of a second system embodiment 1000 in accordance with an embodiment of the present invention. As shown in FIG. 10, multiprocessor system 1000 is a point-to-point interconnect system, and includes a first processing element 1070 and a second processing element 1080 coupled via a point-to-point interconnect 1050. As shown in FIG. 10, each of processing elements 1070 and 1080 may be multicore processors, including first and second processor cores (i.e., processor cores 1074a and 1074b and processor cores 1084a and 1084b).

Alternatively, one or more of processing elements 1070, 1080 may be an element other than a processor, such as an accelerator or a field programmable gate array.

While shown with only two processing elements 1070, 1080, it is to be understood that the scope of the present invention is not so limited. In other embodiments, one or more additional processing elements may be present in a given processor.

First processing element 1070 may further include a memory controller hub (MCH) 1072 and point-to-point (P-P) interfaces 10710 and 1078. Similarly, second processing element 1080 may include a MCH 1082 and P-P interfaces 1086 and 1088. As shown in FIG. 10, MCH's 1072 and 1082 couple the processors to respective memories, namely a memory 1042 and a memory 1044, which may be portions of main memory locally attached to the respective processors.

First processing element 1070 and second processing element 1080 may be coupled to a chipset 1090 via P-P interconnects 1076,1086 and 1084, respectively. As shown in FIG. 10, chipset 1090 includes P-P interfaces 1094 and 1098. Furthermore, chipset 1090 includes an interface 1092 to couple chipset 1090 with a high performance graphics engine 1048. In one embodiment, bus 1049 may be used to couple graphics engine 1048 to chipset 1090. Alternately, a point-to-point interconnect 1049 may couple these components.

In turn, chipset 1090 may be coupled to a first bus 1016 via an interface 696. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard/mouse 1022, communication devices 1026 and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020. Note that other architectures are possible. For example, instead of the point-to-point architecture of FIG. 10, a system may implement a multi-drop bus or another such architecture.

Figure 11:
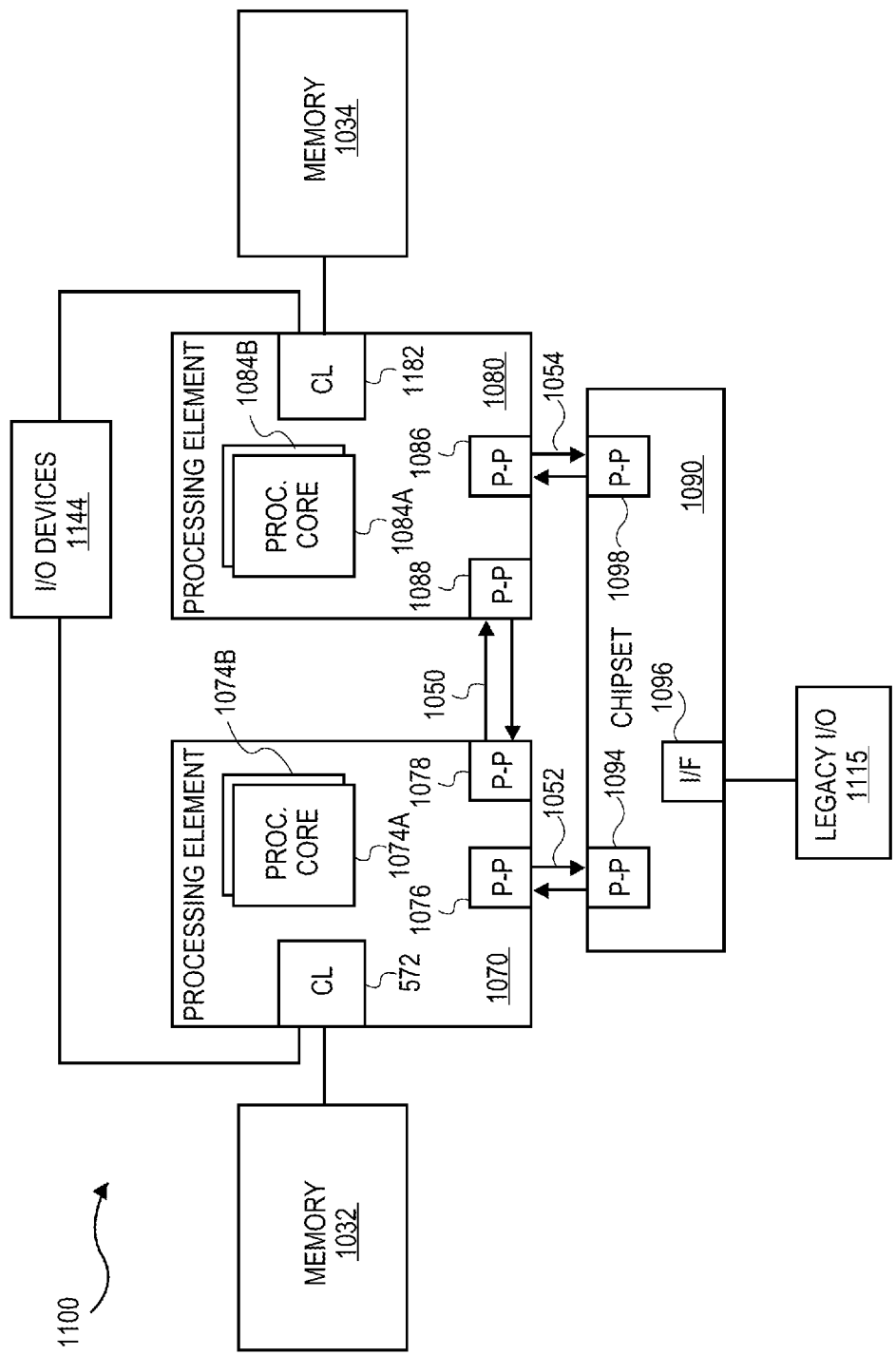
FIG. 11 is a block diagram in accordance with at least one other embodiment of a system including multiple processing elements capable of executing multiple software threads concurrently.

Referring now to FIG. 11, shown is a block diagram of a third system embodiment 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processing elements 1070, 1080 may include integrated memory and I/O control logic ("CL") 1172 and 1182, respectively. For at least one embodiment, the CL 1172, 1182 may include memory controller hub logic (MCH) such as that described above in connection with FIGS. 9 and 10. In addition. CL 1172, 1182 may also include I/O control logic. FIG. 11 illustrates that not only are the memories 1032, 1034 coupled to the CL 1172, 1182, but also that I/O devices 1114 are also coupled to the control logic 1172, 1182. Legacy I/O devices 1115 are coupled to the chipset 1090.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Accordingly, embodiments of the invention also include tangible media that are machine-accessible and computer usable, the media containing instructions for performing the operations of a method (such as methods 400, 500, 600, 800 and 1200 discussed above). Embodiments of the invention also include tangible media that are machine-accessible and computer usable, the media containing design data, such as HDL, which defines structures, circuits, apparatuses, processors and/or system features described herein. Such embodiments may also be referred to as computer program products.

Such machine-accessible, computer-usable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of computer-usable media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

A detailed description has been given herein with reference to specific example embodiments. It will, however, be evident that various modifications and changes may be made thereto without departing from the broader spirit and scope of the invention as set forth in the appended claims. While particular embodiments of the present invention have been shown and described, it will be obvious to those skilled in the art that numerous changes, variations and modifications can be made without departing from the scope of the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. The appended claims are to encompass within their scope all such changes, variations, and modifications that fall within the true scope and spirit of the present invention.

What is claimed is:

1. A system, comprising:
   a processing system having a plurality of thread execution units to execute a plurality of threads for concurrent data processing;
   at least one memory element coupled to the processing system, wherein the memory element is to store a data parallel queue having a structure to hold one or more nodes, individual nodes include a plurality of work items, and each work item corresponds to a different subset of a set of data, and wherein the data parallel queue is a singly-linked linked list; and
   scheduling logic to cause multiple different threads to concurrently access the data parallel queue to pick corresponding multiple different work items to execute, and to maintain the multiple different work items in the data parallel queue while the multiple different threads execute the corresponding multiple different work items, wherein the multiple different threads execute the corresponding multiple different work items by each performing a same set of instructions on the corresponding multiple different subsets of the set of data;
   said scheduling logic further comprising:
      logic to direct a thread to a task scheduling queue if the data parallel queue is empty;
      logic to perform a lock-free enqueue of a new node into the data parallel queue; and
      logic to perform a wait-free de-queue of a particular node from the data parallel queue in response to completion of all work items of the particular node and concurrently with the performance of the lock-free enqueue of the new node.

2. The system of claim 1, wherein the thread execution units are not graphics processing units.

3. The system of claim 1, wherein the thread execution units are single-threaded processor cores.

4. The system of claim 1, wherein the thread execution units are multithreaded processing cores configured to perform simultaneous multithreading.

5. The system of claim 1, wherein assignment of a respective work item to a particular one of said thread execution units is performed during run-time.

6. The system of claim 1, wherein each node comprises a count field having a value that represents the number of work items of the node executed or remaining to be executed.

7. The system of claim 1, wherein an individual one of the multiple different threads picks an individual one of the corresponding multiple different work items to execute based on an identifier of the individual one of the multiple different threads.

8. A method, comprising:
   during execution by a processing system that does not provide hardware-based scheduling of data-parallel workloads and responsive to a first request by a first thread to select a work item from a first node of a linked list of nodes, the first node including a plurality of data-parallel work items, determining a first work item of the first node to be executed by the first thread, wherein said first request is made concurrently with a second request from a second thread to select a work item from the first node of the linked list of nodes, wherein said determining is performed during runtime execution of the first thread, and wherein said first work item is a data-parallel task in which the same instructions associated with the second work item of the first node are to be performed, but on a different sub-set of a set of data than the second work item;
   responsive to a third request by the first thread to select a work item from a second node of the linked list of nodes, the second node including a plurality of data-parallel work items, determining a second work item of the second node, to be executed by the first thread at a time when the second thread has not completed execution of a work item from the first node determined in response to the second request;
   directing a thread to a task scheduling queue if the linked list of nodes is empty;
   performing a lock-free enqueue of a new node into the linked list of nodes; and
   performing a wait-free de-queue of a particular node from the linked list of nodes in response to completion of all work items of the particular node and concurrently with the performance of the lock-free enqueue of the new node.

9. The method of claim 8 wherein said first node represents a graphics rendering task.

10. The method of claim 8 wherein said first node represents a task associated with a financial workload.

11. One or more non-transitory computer readable media having instructions thereon that, in response to execution by one or more processing devices of a computing device, cause the computing device to:
   during execution by a processing system that does not provide hardware-based scheduling of data-parallel workloads and responsive to a first request by a first thread to select a work item from a first node of a linked list of nodes, the first node including a plurality of data-parallel work items, determine a first work item of the first node to be executed by the first thread, wherein said first request is made concurrently with a second request from a second thread to select a work item from the first node of the linked list of nodes, wherein said determination is performed during runtime execution of the first thread, and wherein said first work item is a data-parallel task in which the same instructions associated with the second work item of the first node are to be performed, but on a different sub-set of a set of data than the second work item;
   responsive to a third request by the first thread to select a work from a second node of the linked list of nodes, the second node including a plurality of data-parallel work items, determine a second work item of the second node, to be executed by the first thread at a time when the second thread has not completed execution of a work item from the first node determined in response to the second request;
   direct a thread to a task scheduling queue if the linked list of nodes is empty;
   perform a lock-free enqueue of a new node into the linked list of nodes; and
   perform a wait-free de-queue of a particular node from the linked list of nodes in response to completion of all work items of the particular node and concurrently with the performance of the lock-free enqueue of the new node.

12. The one or more non-transitory computer readable media of claim 11, wherein said first node represents a graphics rendering task.

13. The one or more non-transitory computer readable media of claim 11, wherein said first node represents a task associated with a financial workload.

14. A computing system, comprising:
  circuitry to, during execution by a processing system that does not provide hardware-based scheduling of data-parallel workloads and responsive to a first request by a first thread to select a work item from a first node of a linked list of nodes, the first node including a plurality of data-parallel work items, determine a first work item of the first node to be executed by the first thread, wherein said first request is made concurrently with a second request from a second thread to select a work item from the first node of the linked list of nodes, wherein said determination is performed during runtime execution of the first thread, and wherein said first work item is a data-parallel task in which the same instructions associated with the second work item of the first node are to be performed, but on a different sub-set of a set of data than the second work item;
  circuitry to, responsive to a third request by the first thread to select a work from a second node of the linked list of nodes, the second node including a plurality of data-parallel work items, determine a second work item of the second node, to be executed by the first thread at a time when the second thread has not completed execution of a work item from the first node determined in response to the second request;
  circuitry to direct a thread to a task scheduling queue if the linked list of nodes is empty;
  circuitry to perform a lock-free enqueue of a new node into the linked list of nodes; and
  circuitry to perform a wait-free de-queue of a particular node from the linked list of nodes in response to completion of all work items of the particular node and concurrently with the performance of the lock-free enqueue of the new node.

15. The computing system of claim 14, wherein said first node represents a graphics rendering task.

16. The computing system of claim 14, wherein said first node represents a task associated with a financial workload.

* * * * *